(12) United States Patent
Yamaji et al.

(10) Patent No.: US 11,663,619 B2
(45) Date of Patent: May 30, 2023

(54) IMAGE PROCESSING SYSTEM, IMAGE PROCESSING METHOD, AND PROGRAM

(71) Applicant: FUJIFILM Corporation, Tokyo (JP)

(72) Inventors: Kei Yamaji, Tokyo (JP); Tetsuya Matsumoto, Tokyo (JP); Shinichiro Sonoda, Tokyo (JP); Nobuya Tanaka, Tokyo (JP); Hirotoshi Yoshizawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 441 days.

(21) Appl. No.: 16/903,857

(22) Filed: Jun. 17, 2020

(65) Prior Publication Data

US 2020/0410569 A1    Dec. 31, 2020

(30) Foreign Application Priority Data

Jun. 28, 2019  (JP) .............................. JP2019-121331

(51) Int. Cl.
*G06Q 30/00*  (2023.01)
*G06Q 30/0201*  (2023.01)
(Continued)

(52) U.S. Cl.
CPC ......... *G06Q 30/0206* (2013.01); *G06F 16/51* (2019.01); *G06N 20/00* (2019.01);
(Continued)

(58) Field of Classification Search
CPC .................................................. G06Q 30/0631
See application file for complete search history.

(56) References Cited

U.S. PATENT DOCUMENTS

| | | | |
|---|---|---|---|
| 2016/0162982 A1* | 6/2016 | Caiman ................. | G06V 20/46 705/26.41 |
| 2020/0285851 A1* | 9/2020 | Lin ....................... | G06T 15/205 |
| 2022/0171795 A1* | 6/2022 | Muthuswamy ....... | G06F 16/587 |

FOREIGN PATENT DOCUMENTS

| | | |
|---|---|---|
| JP | 2018-045571 A | 3/2018 |
| JP | 6305483 B2 | 4/2018 |

(Continued)

OTHER PUBLICATIONS

Vasudevan, Smrithi, et al. "Image-based recommendation engine using VGG model." Advances in Communication and Computational Technology. Springer, Singapore, 2021. 257-265.*

(Continued)

*Primary Examiner* — Kathleen Palavecino
(74) *Attorney, Agent, or Firm* — Studebaker & Brackett PC

(57) ABSTRACT

Provided are an image processing system, an image processing method, and a program that can provide recommendation information according to a disposable income estimated on the basis of an analysis result of an image group.

The image processing system, the image processing method, and the program include recognizing an object of an analysis target image of a user (44), converting information on the object into disposable income range information of the user (50), acquiring accessory information including imaging date information of the analysis target image, and deriving an appearance frequency of the object on the basis of the imaging date information (52), deriving a weighting coefficient on the basis of the appearance frequency information of the object (54), estimating the disposable income of the user using the disposable income range information and the (Continued)

weighting coefficient (56), and transmitting recommendation information corresponding to the disposable income of the user (58).

22 Claims, 19 Drawing Sheets

(51) Int. Cl.
*G06Q 30/0601* (2023.01)
*G06F 16/51* (2019.01)
*G06Q 30/02* (2023.01)
*G06N 20/00* (2019.01)
*G06V 20/52* (2022.01)
*G06V 20/00* (2022.01)

(52) U.S. Cl.
CPC ..... *G06Q 30/0201* (2013.01); *G06Q 30/0278* (2013.01); *G06Q 30/0631* (2013.01); *G06V 20/00* (2022.01); *G06V 20/52* (2022.01)

(56) References Cited

FOREIGN PATENT DOCUMENTS

JP 2018-110023 A 7/2018
JP 6494576 B2 4/2019

OTHER PUBLICATIONS

Google Photos Free storage and automatic organization for all your memories; Google; Jun. 7, 2019; online, URL: https://www.google.com/photos/about/.

An Office Action; "Notice of Reasons for Refusal," mailed by the Japanese Patent Office dated Jul. 21, 2022, which corresponds to Japanese Patent Application No. 2019-121331 and is related to U.S. Appl. No. 16/903,857; with English language translation.

\* cited by examiner

FIG. 3

| CLASSIFICATION | ITEM | HOW TO USE |
|---|---|---|
| ACCESSORY INFORMATION | IMAGING DATE INFORMATION | APPEARANCE FREQUENCY FOR EACH OBJECT |
| | GPS INFORMATION | IMAGING LOCATION |
| IMAGE CONTENT | SUBJECT (DISHES, SUITS, WATCHES, OR THE LIKE) | ARTICLE RECOGNITION |
| | SCENE (TOURIST SPOTS, THEME PARKS, OR THE LIKE) | IMAGING LOCATION RECOGNITION |
| | SCREENSHOT (MEMO IMAGE OF SMART PHONE) | SPECIFYING PURCHASED ITEM, USED SERVICE |

| | ONE DAY/ SIX MONTHS | ONE DAY/ THREE MONTHS | ONE DAY/ ONE MONTH | ONE DAY/ TWO WEEKS | ONE DAY/ ONE WEEK |
|---|---|---|---|---|---|
| FRUIT | 0.1 | 0.2 | 0.3 | 0.5 | 1 |

| | ONE DAY/ ONE YEAR | ONE DAY/ SIX MONTHS | ONE DAY/ THREE MONTHS | ONE DAY/ ONE MONTH | ONE DAY/ TWO WEEKS |
|---|---|---|---|---|---|
| JEWELRY | 0.2 | 0.3 | 0.5 | 1 | 2 |

FIG. 16

| | 1 | 2 | 3 | 4 | 5 |
|---|---|---|---|---|---|
| TRAVELING | PREFECTURE | SAME REGION | ADJACENT REGION | NON-ADJACENT REGION | OVERSEAS |
| THEME PARK | P | Q | R | S | T |

FIG. 17

| | 1 | 2 | 3 | 4 | 5 |
|---|---|---|---|---|---|
| TRAVELING | C | D | E | F | G |
| THEME PARK | A | B | C | D | E |

FIG. 18

| | ONCE/5 YEARS | ONCE/3 YEARS | ONCE/2 YEARS | ONCE/1 YEAR | ONCE/HALF YEAR |
|---|---|---|---|---|---|
| TRAVELING | 0.2 | 0.3 | 0.5 | 1 | 2 |
| | ONE DAY/3 YEARS | ONE DAY/2 YEARS | ONE DAY/1 YEAR | ONE DAY/6 MONTHS | ONE DAY/3 MONTHS |
| THEME PARK | 0.1 | 0.2 | 0.3 | 0.5 | 1 |

# IMAGE PROCESSING SYSTEM, IMAGE PROCESSING METHOD, AND PROGRAM

CROSS-REFERENCE TO RELATED APPLICATIONS

The present application claims priority under 35 U.S.C. § 119 to Japanese Patent Application No. 2019-121331 filed on Jun. 28, 2019. The above application is hereby expressly incorporated by reference, in its entirety, into the present application.

BACKGROUND OF THE INVENTION

1. Field of the Invention

The present invention relates to an image processing system, an image processing method, and a program.

2. Description of the Related Art

A form using cloud computing has been proposed as a photo management service. Google Photo (search on Jun. 7, 2019, URL: https://www.google.com/photos/about/) discloses a cloud computing system that manages still images, motion pictures, and the like uploaded from a user terminal such as a smartphone.

The system disclosed in the document automatically classifies images uploaded according to an imaging date, time, and location. The system also analyzes subjects of the images, automatically classifies the images according to an analysis content of the subjects, and provides recommendation information according to preference and the like of a user on the basis of an image analysis result.

JP6305483B discloses a service providing system comprising a facing apparatus that faces a user. The facing apparatus disclosed in the document comprises an imaging apparatus, analyzes image data captured using the imaging apparatus, and detects a person, a vehicle, and belongings of a person in an imaging visual field.

Further, the system individually recognizes the detected person and the like, acquires characteristic information such as an attribute and a type of the person and the like, and provides recommendation information according to the characteristic information. The system also estimates income information from the information on the vehicle used and changes the recommended product.

JP6494576B discloses an apparatus that estimates asset information of a user on the basis of behavior history of the user on the network, such as the number of image data posted on the SNS and provides a service tailored to the asset information of the user. SNS is an abbreviation for social networking service.

The apparatus inputs the behavior history of the user and generates a model that outputs an index value indicating which user is a user having more assets. As an example of the model, the document exemplifies a model in which an explanatory variable x corresponding to characteristic information such as a transmission history of a search query is defined, a weighting coefficient $\omega$ is defined for the explanatory variable, and a combination of $x \times \omega$ obtained by multiplying the explanatory variable x by a weighting coefficient $\omega$ is used for a plurality of characteristic information.

SUMMARY OF THE INVENTION

However, the system disclosed in JP6305483B detects a subject from one image captured using the imaging apparatus included in the facing apparatus, and acquires characteristic information of the subject. Then, a vehicle or the like that is accidentally captured can be detected as a subject, and it can be impossible to provide appropriate recommendation information to an appropriate user.

JP6494576B does not specifically disclose a weighting coefficient applied in a case of generating a model representing an asset of a user.

The present disclosure has been made in view of the above-mentioned problems and an object of the present disclosure is to provide an image processing system, an image processing method, and a program that can provide recommendation information according to a disposable income estimated on the basis of an analysis result of an image group including a plurality of images.

To achieve the above object, the following aspects of the invention are provided.

According to a first aspect, there is provided an image processing system comprising: an object recognition unit that analyzes two or more analysis target images included in an image group including a plurality of images related to a user and recognizes an object included in each of the two or more analysis target images; a disposable income range conversion unit that converts information on the object recognized using the object recognition unit into disposable income range information representing a range of a disposable income of the user; an accessory information acquisition unit that acquires accessory information of the analysis target image including imaging date information representing an imaging date of the analysis target image for the two or more analysis target images in which the object is recognized using the object recognition unit; a frequency derivation unit that derives an appearance frequency of the object on the basis of the imaging date information; a coefficient derivation unit that derives a weighting coefficient corresponding to the object on the basis of appearance frequency information representing the appearance frequency; a disposable income estimation unit that estimates the disposable income of the user using the disposable income range information and the weighting coefficient; and a recommendation information transmission unit that transmits recommendation information related to the object to the user according to the disposable income of the user.

According to the first aspect, an image group including the plurality of images is analyzed, the information of the object recognized from the image is converted into the disposable income range information of the user, and the weighting coefficient derived on the basis of the appearance frequency information of the object is applied to the disposable income range information to estimate the disposable income of the user. Thereby, it is possible to provide the recommendation information according to the disposable income estimated on the basis of the analysis result of the image group including the plurality of images.

The object can include at least one of an article or an event represented by the imaging scene.

A term image can include a concept of image data which is a signal representing an image.

The disposable income only needs to be an estimated value of an index representing a purchasing power of the user, and is not limited to a residual income calculated by subtracting taxes and the like from the income of the user.

In the image processing system according to the first aspect, a second aspect may have a configuration that the object recognition unit recognizes an article included in the analysis target image as the object.

According to the second aspect, the disposable income of the user can be estimated on the basis of the articles included in the analysis target image.

In the image processing system according to the second aspect, a third aspect may be configured to comprise a belonging determination unit that determines whether the object is belongings or a rental item on the basis of the appearance frequency of the object, in which the recommendation information transmission unit transmits information on a purchased item as the recommendation information in a case where the object is the belongings of the user and transmits information on the rental item as the recommendation information in a case where the object is the rental item.

According to the third aspect, the recommendation information can be provided according to whether the object is belongings of the user or a rental item.

In the image processing system according to any one of the first to third aspects, a fourth aspect may be configured to comprise a type determination unit that determines a type of the object recognized using the object recognition unit.

According to the fourth aspect, the information on the object can be converted into the disposable income range information of the user by using the type of the object.

In the image processing system according to the fourth aspect, a fifth aspect may be configured to comprise a type storage unit that stores a relationship between the object and the type of the object, in which the type determination unit determines the type of the object with reference to the type storage unit.

According to the fifth aspect, a certain accuracy can be secured in determining the type of the object.

In the image processing system according to the first aspect, a sixth aspect may have a configuration that the object recognition unit recognizes an imaging scene of the analysis target image as the object.

According to the sixth aspect, the disposable income of the user can be estimated on the basis of the imaging scene of the analysis target image.

In the image processing system according to the sixth aspect, a seventh aspect may have a configuration that the object recognition unit recognizes an imaging scene of the analysis target image as the object.

According to the seventh aspect, the disposable income of the user can be estimated on the basis of the event corresponding to the imaging scene of the analysis target image.

Examples of the event include traveling, visiting theme parks, eating and watching sports, and the like.

In the image processing system according to the sixth or seventh aspect, an eighth aspect may be configured to comprise a type determination unit that determines a type of the object recognized using the object recognition unit.

According to the eighth aspect, the information on the object can be converted into the disposable income range information of the user by using the type of the object.

In the image processing system according to the eighth aspect, a ninth aspect may be configured to comprise a type storage unit that stores a relationship between the object and the type of the object, in which the type determination unit determines the type of the object with reference to the type storage unit.

According to the ninth aspect, a certain accuracy can be secured in determining the type of the object.

In the image processing system according to the eighth or ninth aspect, a tenth aspect may be configured to comprise an imaging location information acquisition unit that acquires information on an imaging location of the analysis target image, in which the type determination unit determines an event corresponding to the object on the basis of a positional relationship between a reference location of the user corresponding to the image group and the imaging location of the analysis target image.

According to the tenth aspect, the event can be determined on the basis of the positional relationship between the reference location of the user and the imaging location of the analysis target image.

In the image processing system according to the tenth aspect, an eleventh aspect may have a configuration that the type determination unit determines a type of event corresponding to the object on the basis of a distance from the reference location to the imaging location of the analysis target image.

According to the eleventh aspect, the event can be determined on the basis of the reference location of the user, the imaging location of the analysis target image, and the distance.

In the image processing system according to the tenth or eleventh aspect, a twelfth aspect may have a configuration that the imaging location information acquisition unit acquires the accessory information including imaging location information representing the imaging location of the analysis target image, using the accessory information acquisition unit.

According to the twelfth aspect, the imaging location of the image can be specified on the basis of the information on the imaging location included in the accessory information.

In the image processing system according to the tenth or eleventh aspect, a thirteenth aspect may have a configuration that the imaging location information acquisition unit analyzes the analysis target image and specifies the imaging location of the analysis target image.

According to the thirteenth aspect, the imaging location of the image can be specified on the basis of the analysis result of the analysis target image.

In the image processing system according to any one of the tenth to thirteenth aspects, a fourteenth aspect may have a configuration that the accessory information acquisition unit acquires the accessory information including the information on the reference location.

According to the fourteenth aspect, the reference location can be specified on the basis of the information on the reference location included in the accessory information.

In the image processing system according to any one the tenth to thirteenth aspects, a fifteenth aspect may be configured to comprise a reference location specification unit that analyzes the analysis target image and specifies the reference location.

According to the fifteenth aspect, the reference location can be specified on the basis of the analysis result of the analysis target image.

In the image processing system according to any one the first to fifteenth aspects, a sixteenth aspect may be configured to comprise a price range determination unit that determines a price range of the object corresponding to a type of the object.

According to the sixteenth aspect, the price range of the object can be converted into the disposable income range of the user.

In the image processing system according to the sixteenth aspect, a seventeenth aspect may be configured to comprise a price range storage unit that stores a relationship between the type of the object and the price range, in which the price range determination unit determines the price range of the object with reference to the price range storage unit.

According to the seventeenth aspect, a certain accuracy can be secured in determining the price range of the object.

In the image processing system according to the seventeenth aspect, a eighteenth aspect may be configured to comprise a disposable income range storage unit that stores a relationship between the price range and the disposable income range representing the range of the disposable income of the user, in which the disposable income range conversion unit converts the price range information representing the price range into the disposable income range information representing the disposable income range of the user with reference to the disposable income range storage unit.

According to the eighteenth aspect, a certain accuracy can be secured in converting the price range of the object into the disposable income range of the user.

In the image processing system according to any one of the first to eighteenth aspects, a nineteenth aspect may be configured to comprise a coefficient storage unit that stores a relationship between a type of the object and the weighting coefficient, in which the coefficient derivation unit derives the weighting coefficient applied to the object with reference to the coefficient storage unit.

According to the nineteenth aspect, a certain accuracy can be secured in deriving the weighting coefficient.

In the image processing system according to any one of the first to nineteenth aspects, a twentieth aspect may be configured to comprise a user information acquisition unit that acquires user information for specifying the user.

According to the twentieth aspect, the user of the analysis target image can be specified.

According to a twenty-first aspect, there is provided an image processing method comprising: an object recognition step of analyzing two or more analysis target images included in an image group including a plurality of images related to a user and recognizing objects included in each of the two or more analysis target images; a disposable income range conversion step of converting information on the object recognized in the object recognition step into disposable income range information representing a range of a disposable income of the user; an accessory information acquisition step of acquiring accessory information of the analysis target image including imaging date information representing an imaging date of the analysis target image for the two or more analysis target images in which the object is recognized in the object recognition step; a frequency derivation step of deriving an appearance frequency of the object on the basis of the imaging date information; a coefficient derivation step of deriving a weighting coefficient corresponding to the object on the basis of appearance frequency information representing the appearance frequency; a disposable income estimation step of estimating the disposable income of the user using the disposable income range information and the weighting coefficient; and a recommendation information transmission step of transmitting recommendation information related to the object to the user according to the disposable income of the user.

According to the twenty-first aspect, the same effect as in the first aspect can be obtained.

In the twenty-first aspect, the same matters as those specified in the second to twentieth aspects can be appropriately combined. In this case, a component that performs processing or function specified in the image processing system can be grasped as a component of the image processing method that performs the corresponding processing or function.

According to a twenty-second aspect, there is provided a program that causes a computer to realize: an object recognition function that analyzes two or more analysis target images included in an image group including a plurality of images related to a user and recognizes objects included in each of the two or more analysis target images; a disposable income range conversion function that converts information of the object recognized using the object recognition function into disposable income range information representing a range of a disposable income of the user; an accessory information acquisition function that acquires accessory information of the analysis target image including imaging date information representing an imaging date of the analysis target image for the two or more analysis target images in which the object is recognized using the object recognition function; a frequency derivation function that derives an appearance frequency of the object on the basis of the imaging date information; a coefficient derivation function that derives a weighting coefficient corresponding to the object on the basis of appearance frequency information representing the appearance frequency; a disposable income estimation function that estimates the disposable income of the user using the disposable income range information and the weighting coefficient; and a recommendation information transmission function that transmits recommendation information related to the object to the user according to the disposable income of the user.

According to the twenty-second aspect, the same effect as in the first aspect can be obtained.

In the twenty-second aspect, the same matters as those specified in the second to twentieth aspects can be appropriately combined. In this case, a component that performs the processing or function specified in the image processing system can be grasped as a component of the program that performs the corresponding processing or function.

According to the present invention, an image group including the plurality of images is analyzed, the information of the object recognized from the image is converted into the disposable income range information of the user, and the weighting coefficient derived on the basis of the appearance frequency information of the object is applied to the disposable income range information to estimate the disposable income of the user. Thereby, it is possible to provide the recommendation information according to the disposable income estimated on the basis of the analysis result of the image group including the plurality of images.

BRIEF DESCRIPTION OF THE DRAWINGS

FIG. 3 is an explanatory diagram of an image analysis.

FIG. 16 is a schematic diagram of a price range determination table applied to the image processing system according to the third embodiment.

FIG. 17 is a schematic diagram of a disposable income range conversion table applied to the image processing system according to the third embodiment.

FIG. 18 is a schematic diagram of a coefficient table applied to the image processing system according to the third embodiment.

DESCRIPTION OF THE PREFERRED EMBODIMENTS

Hereinafter, preferred embodiments of the present invention will be described in detail with reference to the attached drawings. In the specification, the same component is denoted by the same reference sign, and redundant description will be omitted as appropriate.

Configuration Example of Image Processing System
Overall Configuration

Figure 1:
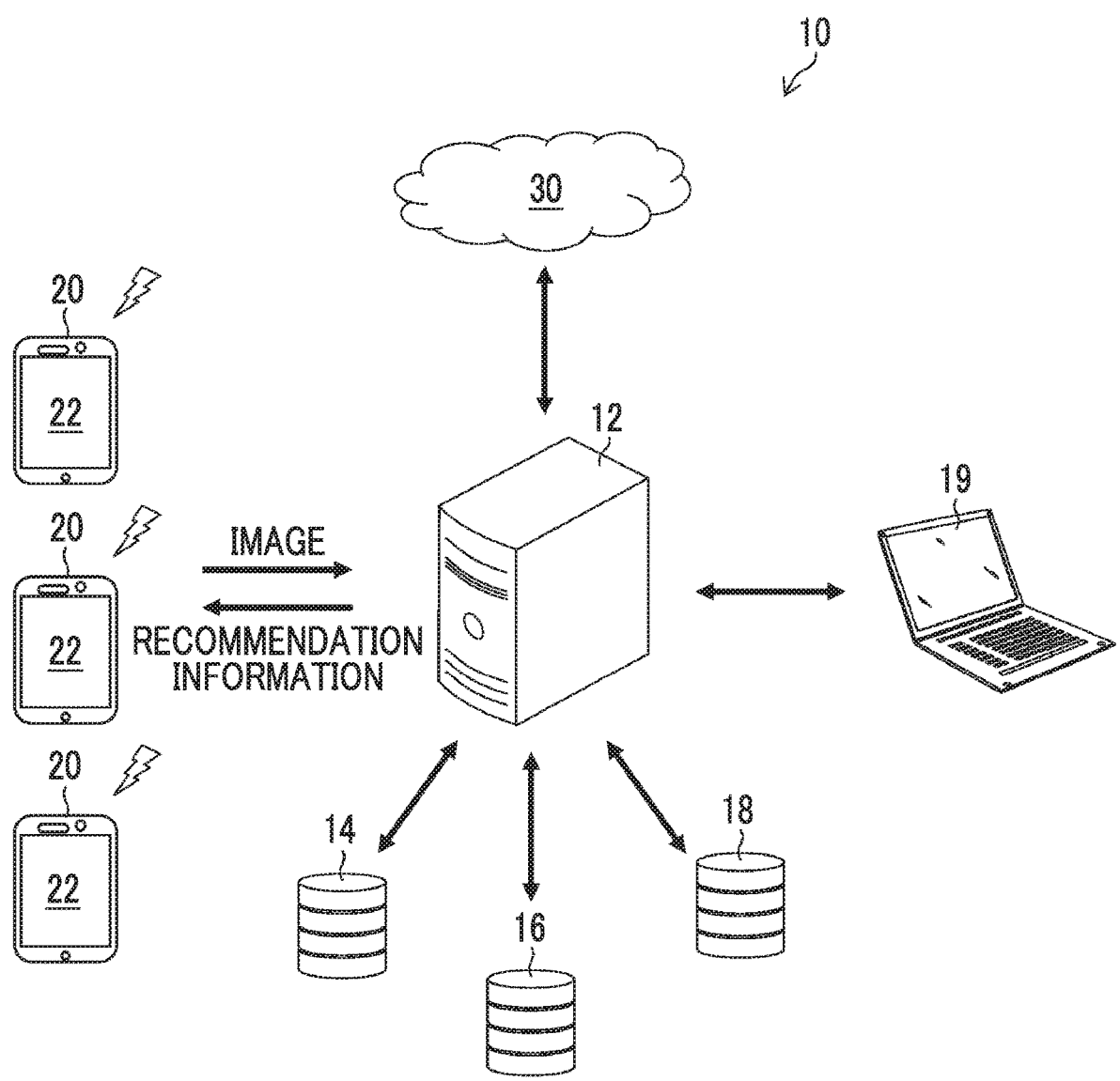
FIG. 1 is an overall configuration diagram of an image processing system according to an embodiment.

FIG. 1 is an overall configuration diagram of an image processing system according to an embodiment. An image processing system 10 illustrated in FIG. 1 comprises a server apparatus 12. The server apparatus 12 reads a plurality of images related to a user stored in an image database 14, analyzes an image which is read out, and provides recommendation information to the user on the basis of an image analysis result. A user terminal apparatus 20 displays the recommendation information using a display unit 22.

A term image in the specification can include a concept of image data which is a signal representing an image.

The image processing system 10 comprises a server apparatus 12, an image database 14, a disposable income database 16, a recommendation information database 18, and a manager terminal apparatus 19. The server apparatus 12 is connected to the image database 14, the disposable income database 16, the recommendation information database 18, and the manager terminal apparatus 19 so as to be able to perform data communication. The data communication can be performed through a defined network. Any of a wireless communication form and a wired communication form can be applied to a communication form of the data communication.

The image database 14 is configured to be able to search for an image related to a user whose identification information is used as a search key, using the identification information of a random user as the search key. A user name, a user ID, and the like can be applied to the user identification information. ID is an abbreviation for identification.

The image related to the user can include an image to which a user name or the like is given as accessory information as an imaging person, an image to which a user name or the like is tagged, and the like. That is, the image related to the user can include an image captured using an imaging apparatus owned by the user and an image including the user as a subject.

The disposable income database 16 comprises a price range determination database that stores a price range determination table representing a relationship between a type of an object and a price range. The disposable income database 16 comprises a disposable income range conversion database that stores a disposable income range conversion table representing a conversion relationship between the price range and a disposable income range.

The disposable income database 16 comprises a weighting coefficient database that stores a weighting coefficient table representing a relationship between an appearance frequency of an object extracted from an image and a weighting coefficient.

Figure 2:
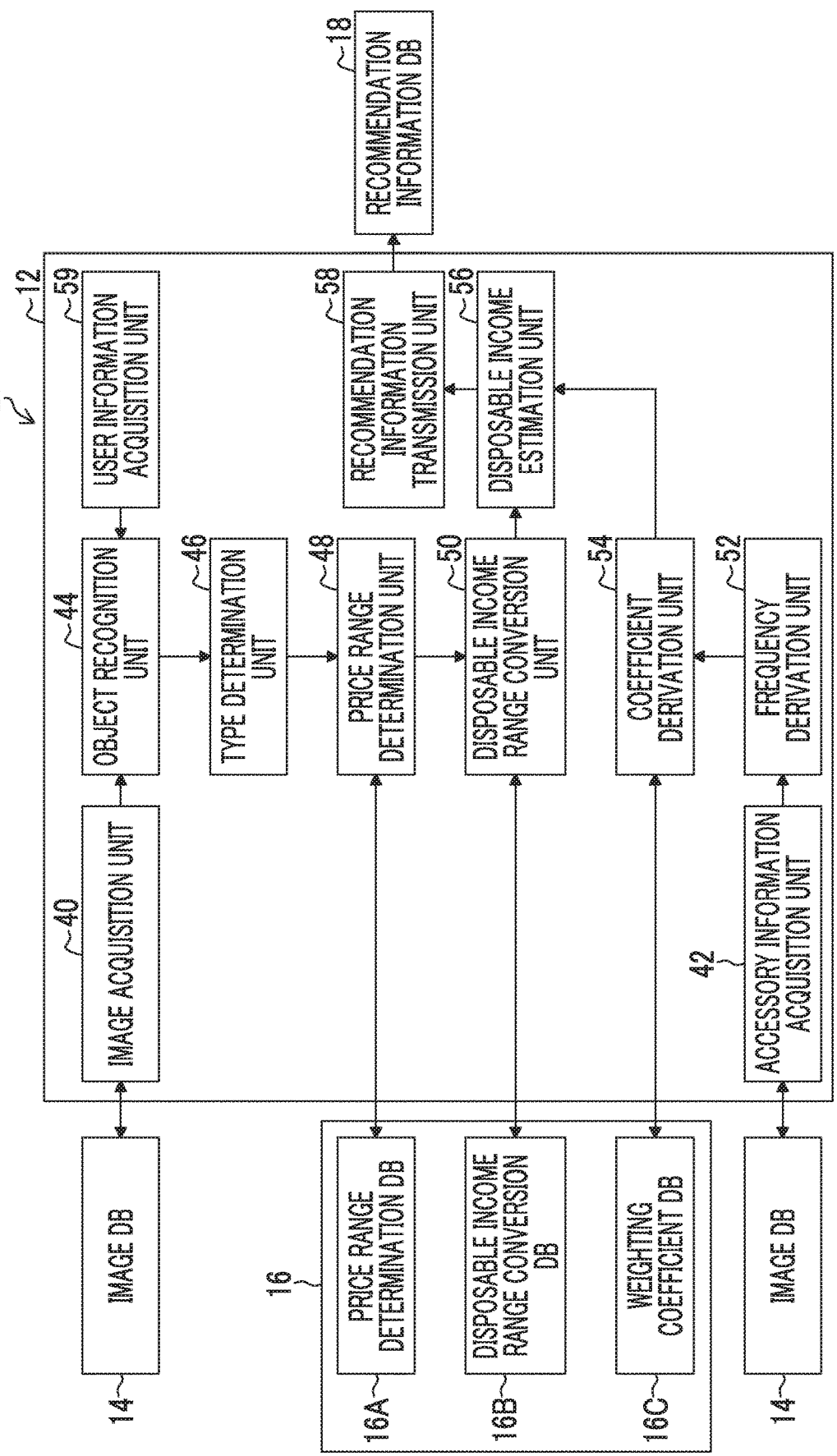
FIG. 2 is a functional block diagram of a server apparatus according to a first embodiment.

The price range determination database is illustrated in FIG. 2 using a reference sign 16A. The disposable income range conversion database is illustrated in FIG. 2 using a reference sign 16B. The weighting coefficient database is illustrated in FIG. 2 using a reference sign 16C.

The price range determination database that stores the price range determination table corresponds to an example of a price range storage unit that stores the relationship between the type of the object and the price range. The disposable income range conversion database that stores the disposable income range conversion table representing the conversion relationship between the price range and the disposable income range corresponds to an example of a disposable income range storage unit.

The weighting coefficient database that stores the weighting coefficient table representing the relationship between the appearance frequency of the object and the weighting coefficient corresponds to an example of a coefficient storage unit that stores the relationship between the type of the object and the weighting coefficient.

The recommendation information database 18 stores a recommendation information table representing a relationship between disposable income and recommended products and the like. The server apparatus 12 refers to the recommendation information database 18 using information on the disposable income, and transmits recommendation information based on the disposable income of the user to the user terminal apparatus 20.

The manager terminal apparatus 19 performs update control of a table provided in the disposable income database 16 and the like. The update of the table provided in the disposable income database 16 or the like may be automatically performed by the server apparatus 12.

A term disposable income in the present specification only needs to be an estimated value of an index representing a purchasing power of the user, and is not limited to a residual income calculated by subtracting taxes and the like from the income of the user.

A smart device used by each user such as a smartphone and a tablet can be applied to the user terminal apparatus 20. The user terminal apparatus 20 comprises a communication unit. The user terminal apparatus 20 can perform data communication with the server apparatus 12 through the communication unit. The illustration of the communication unit is omitted.

The user terminal apparatus 20 comprises a display unit 22. The user terminal apparatus 20 receives the recommendation information transmitted from the server apparatus 12. The user terminal apparatus 20 can display the recommendation information using the display unit 22.

The user terminal apparatus 20 can comprise an imaging unit. The user terminal apparatus 20 can comprise a storage unit that temporarily stores an image captured and acquired using the imaging unit. The user terminal apparatus 20 can upload the image to the image database 14 through the server apparatus 12. In addition, the illustrations of the imaging unit and the storage unit are omitted.

The server apparatus 12 is connected to an internet 30 such that data communication is possible. The server apparatus 12 receives product information and service information applied to recommendation information from a product or other provider through the internet 30.

Hardware Configuration of Image Processing System

A computer can be applied to the server apparatus 12 or the like applied to the image processing system 10. The computer can realize the functions of the image processing system 10 by applying the following hardware and executing a defined program. A program is synonymous with software.

Various processors as a signal processing unit that performs signal processing can be applied to the server apparatus 12 and the like. Examples of the processor include a CPU and a graphics processing unit (GPU). The CPU is a general-purpose processor that executes the program and functions as the signal processing unit. GPU is a processor specialized in image processing. An electric circuit in which electric circuit elements such as semiconductor elements are combined is applied to the hardware of the processor. Each controller comprises a ROM that stores programs and the like, and a RAM that is a work region for various calculations.

Two or more processors may be applied to one signal processing unit. The two or more processors may be the same type of processor or different types of processors. Further, one processor may be applied to a plurality of signal processing units.

Configuration Example of Server Apparatus According to First Embodiment

FIG. 2 is a functional block diagram of a server apparatus according to a first embodiment. DB illustrated in FIG. 2 is an abbreviation for a database. FIG. 2 illustrates two image databases 14, which are the same component.

The server apparatus 12 comprises an image acquisition unit 40 and an accessory information acquisition unit 42. The server apparatus 12 comprises an object recognition unit 44, a type determination unit 46, a price range determination unit 48, and a disposable income range conversion unit 50. The server apparatus 12 comprises a frequency derivation unit 52 and a coefficient derivation unit 54. The server apparatus 12 comprises a disposable income estimation unit 56 and a recommendation information transmission unit 58. The server apparatus 12 comprises a user information acquisition unit 59.

The image acquisition unit 40 acquires an analysis target image from the image database 14. The server apparatus 12 can search for the image database 14 using the user identification information as a search key, and acquire an image related to the user as the analysis target image. The image database 14 transmits the acquired image to the object recognition unit 44.

The accessory information acquisition unit 42 acquires accessory information of the image acquired from the image database 14. The accessory information includes information on an imaging date. The accessory information may include GPS information including information on an imaging location. GPS is an abbreviation for global positioning system. The accessory information acquisition unit 42 transmits the accessory information to the frequency derivation unit 52.

The object recognition unit 44 performs an object recognition process that recognizes an object from the image acquired by using the image acquisition unit 40. The object recognition unit 44 can recognize a plurality of objects from one image. A known method can be applied to the object recognition processing. Here, the detailed description of the object recognition process is omitted.

An article included in the image, a background of the image, a scene of the image, and the like can be applied to the object.

Non-personal objects such as food, vehicles, personal clothes and personal ornaments are applied to the article. A building or a landscape in travel destination, theme parks, or the like can be applied to the background of the image.

The object recognition unit 44 may use tag information or the like as an object recognition result in a case where the object is specified in advance and the object information is added as the tag information or the like. That is, the object recognition unit 44 can comprise a tag information acquisition unit that acquires the tag information.

The object recognition unit 44 may output the recognition result representing that there is no object in a case where the object is not recognized from the image. The server apparatus 12 may not perform processing after the object recognition in the image in which the object is not recognized.

The type determination unit 46 determines the type of the object in the object recognized by using the object recognition unit 44. In a case of determining the type of the object, the type determination unit 46 can refer to a table representing a correspondence relationship between the object and the type of the object. The type determination unit 46 transmits the type information of the object for each object to the price range determination unit 48.

In the present embodiment, the illustration of the type determination database that stores the table representing the correspondence relationship between the object and the type of the object is omitted. The type determination database corresponds to an example of a type storage unit.

The price range determination unit 48 determines the price range of the object on the basis of the type of the object. The price range determination unit 48 refers to a price range determination database 16A in a case of determining the price range of the object. The price range determination unit 48 transmits price range information for each object to the disposable income range conversion unit 50.

The disposable income range conversion unit 50 converts the price range information for each object into disposable income range information representing the disposable income range of the user. The disposable income range conversion unit 50 refers to a disposable income range conversion database 16B in a case of converting the price range information for each object into the disposable income range information. The disposable income range conversion unit 50 transmits the disposable income range information to the disposable income estimation unit 56.

The frequency derivation unit 52 derives, for a plurality of images, the appearance frequency of an object included in the plurality of images using imaging date information included in the accessory information for each image. The frequency derivation unit 52 transmits appearance frequency information representing the appearance frequency of each object to the coefficient derivation unit 54.

The coefficient derivation unit 54 derives a weighting coefficient for each object on the basis of the appearance frequency information for each object. In a case of deriving the weighting coefficient for each object, the coefficient derivation unit 54 refers to a weighting coefficient database 16C. The coefficient derivation unit 54 transmits the weighting coefficient for each object to the disposable income estimation unit 56.

The disposable income estimation unit 56 estimates the disposable income of the user by using the disposable income range information representing the disposable income range for each object and the weighting coefficient for each object. The disposable income estimation unit 56 transmits disposable income estimation information representing a disposable income estimation result of the user to the recommendation information transmission unit 58.

The recommendation information transmission unit 58 sets recommendation information for the user on the basis of the disposable income estimation information of the user. The recommendation information transmission unit 58 refers to the recommendation information database 18 in the case of setting the recommendation information. The recommendation information transmission unit 58 transmits the recommendation information to the user terminal apparatus 20.

The recommendation information transmission unit 58 provides recommendation information such as a product corresponding to the object. For example, in a case where the object is mandarin orange, the recommendation information transmission unit 58 can provide the user with recommendation information such as fruit, fruit processed product, and confectionery made from fruit.

The user information acquisition unit 59 acquires user information for specifying a user. The user information acquisition unit 59 can acquire the user information transmitted from the user terminal apparatus 20 illustrated in FIG. 1. The user information acquisition unit 59 transmits the user information to the object recognition unit 44.

Regarding to Handling of Personal Information

Handling of personal information in the image processing system 10 illustrated in FIGS. 1 and 2 is as follows.

A manager of the image processing system 10 obtains the consent of the user for the analysis of the image of the user. The manager here can include an organization such as a company. As an example of the consent, on a consent screen displayed on the display unit 22 of the user terminal apparatus 20, there is an aspect in which a check mark is put in a check box representing the consent and information representing the consent is transmitted from the user terminal apparatus 20 to the server apparatus 12. The same applies to the following consent.

The manager of the image processing system 10 obtains the consent of the user for providing recommendation information to the user on the basis of the analysis result of the image of the user.

A main body that provides the recommendation information to the user can be the manager of the image processing system 10. The main body that provides the recommendation information can be a provider of a product or the like included in the recommendation information. The provider here can include an organization such as a company.

In a case where a provider of a product or the like provides recommendation information, the consent of the user is obtained regarding delivery of necessary information related to the provision of the recommendation information from the manager of the image processing system 10. The necessary information is the minimum information necessary for providing the recommendation information such as an e-mail address.

In providing information from the manager of the image processing system 10 to an affiliated organization or the like, provision of the user information such as a user name and information leading to specifying the user is prohibited in principle. In a case of performing image analysis of a plurality of users, the above measures are applied to all users. It is assumed that the consent of the user is obtained for providing information after anonymizing in advance.

Explanation of Image Analysis

FIG. 3 is an explanatory diagram of an image analysis. The image analysis is processing for an image performed by the server apparatus 12 illustrated in FIG. 2. The server apparatus 12 can perform the analysis of the accessory information and the analysis of image content as the image analysis.

An imaging date information as the accessory information to be analyzed can be applied to the server apparatus 12. The server apparatus 12 analyzes the imaging date information for a plurality of images included in an image group, and derives an appearance frequency of an object common to the plurality of images. The appearance frequency of a plurality of objects may be derived.

GPS information as the accessory information to be analyzed can be applied to the server apparatus 12 can apply. The server apparatus 12 can analyze the GPS information and specify the imaging location of the image. The server apparatus 12 may analyze information on an imaging apparatus used for capturing the image as the accessory information to be analyzed. The server apparatus 12 may analyze information on a terminal apparatus or the like including the imaging apparatus.

The server apparatus 12 can specify a subject by analyzing the image content. Examples of the subject include foods such as dishes, clothes such as suits, and accessories such as watches. The server apparatus 12 recognizes the article as the subject as an object on the basis of the subject.

The server apparatus 12 can analyze the image content and specify an imaging scene. Examples of the imaging scene include visiting tourist spots, visiting theme parks, eating at restaurants, watching sports, or the like. The server apparatus 12 can recognize an event represented by the imaging scene as the object.

A memo image such as a screenshot as the image can be applied to the server apparatus 12. The server apparatus 12 can analyzes the screenshot and specify a purchased item purchased by the user, a service used by the user, and the like as an object on the basis of the analysis result of the screenshot.

Recommendation Information Providing Method According to First Embodiment

Overall flow of Recommendation Information Providing Method

Figure 4:
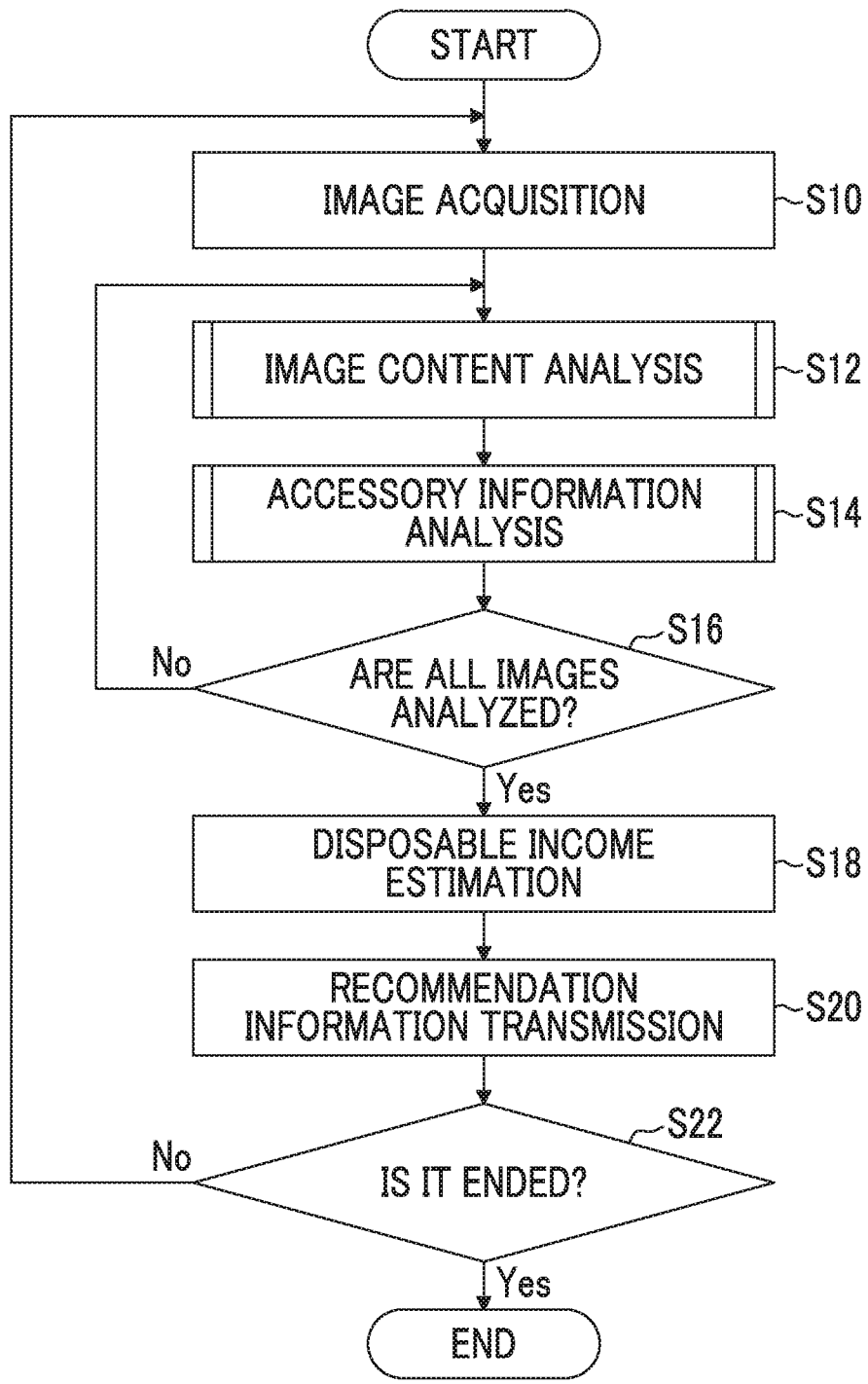
FIG. 4 is a flowchart illustrating a procedure of a recommendation information providing method according to the first embodiment.

FIG. 4 is a flowchart illustrating a procedure of a recommendation information providing method according to the first embodiment. The recommendation information providing method according to the first embodiment described below acquires a plurality of images related to a random user, estimates a disposable income of the user on the basis of the analysis results of a plurality of analysis target images, and provides recommendation information according to the disposable income of the user.

In an image acquisition step S10, the image acquisition unit 40 illustrated in FIG. 2 acquires an analysis target image from the image database 14. The image acquisition step S10 can include an image storage step of storing the acquired analysis target image. After the image acquisition step S10, the process proceeds to an image content analyzing step S12.

The image acquisition step S10 can include a search step of searching for an image related to the user. Further, an image acquisition step can include a login step in which the user performs login. Before performing the image acquisition step S10, the search step or the login step may be performed.

In the image content analyzing step S12, the object recognition unit 44 performs processing that recognizes the object from the image. That is, in the image content analyzing step S12, the object recognition unit 44 analyzes pixels configuring the analysis target image. Further, in the image content analyzing step S12, the type determination unit 46 determines a type of the object.

In the image content analyzing step S12, the price range determination unit 48 determines a price range of the object.

In the image content analyzing step S12, the disposable income range conversion unit 50 converts the price range of the object into a disposable income range.

The image content analyzing step S12 can include a storage step of storing each information. The details of the image content analyzing step S12 will be described later. After the image content analyzing step S12, the process proceeds to the accessory information analyzing step S14.

In the accessory information analyzing step S14, the accessory information acquisition unit 42 acquires imaging date information as accessory information of each image. In the accessory information analyzing step S14, the frequency derivation unit 52 derives an appearance frequency of each object. In the accessory information analyzing step S14, the coefficient derivation unit 54 derives a weighting coefficient for each object.

The accessory information analyzing step S14 can include the storage step of storing each information. The details of the accessory information analyzing step S14 will be described later. After the accessory information analyzing step S14, the process proceeds to the analysis end determination step S16.

In the analysis end determination step S16, the server apparatus 12 determines whether or not the analysis is performed on all the images to be analyzed. In the analysis end determination step S16, in a case where the server apparatus 12 determines that there is an unanalyzed analysis target image, the determination is No.

In the case where the determination is No, the process returns to the image content analyzing step S12, and each step from the image content analyzing step S12 to the analysis end determination step S16 is repeatedly performed until the determination in the analysis end determination step S16 becomes Yes.

On the other hand, in the analysis end determination step S16, in a case where the server apparatus 12 determines that all the images to be analyzed have been analyzed, the determination is Yes. In the case where the determination is Yes, the process proceeds to the disposable income estimation step S18.

In the disposable income estimation step S18, the disposable income estimation unit 56 estimates the disposable income of the user on the basis of an image analysis result in the image content analyzing step S12 and an accessory information analysis result in the accessory information analyzing step S14. The disposable income estimation step S18 can include a storage step of storing a disposable income estimation result. After the disposable income estimation step S18, the process proceeds to a recommendation information transmission step S20.

In the recommendation information transmission step S20, the recommendation information transmission unit 58 sets recommendation information including products and services recommended to the user on the basis of the disposable income estimation result of the user. In the recommendation information transmission step S20, the recommendation information transmission unit 58 transmits the recommendation information to the user terminal apparatus 20. After the recommendation information transmission step S20, the process proceeds to an end determination step S22.

In the end determination step S22, the server apparatus 12 determines whether or not to end a recommendation information providing method. In the end determination step S22, in a case where the server apparatus 12 determines to continue the recommendation information providing method, the determination is No. In the case where the determination is No, the process proceeds to the image acquisition step S10, and each step from the image acquisition step S10 to the end determination step S22 is repeatedly performed on the next image group until the determination in the end determination step S22 becomes Yes.

On the other hand, in the end determination step S22, in a case where the server apparatus 12 determines to end the recommendation information providing method, the determination is Yes. In the case where the determination is Yes, the server apparatus 12 performs defined end processing. An example of an end condition of the recommendation information providing method includes an end of the provision of recommendation information for a preset image group. The recommendation information providing method described in the embodiment corresponds to an example of an image processing method.

Details of Image Content Analyzing Step

Figure 5:
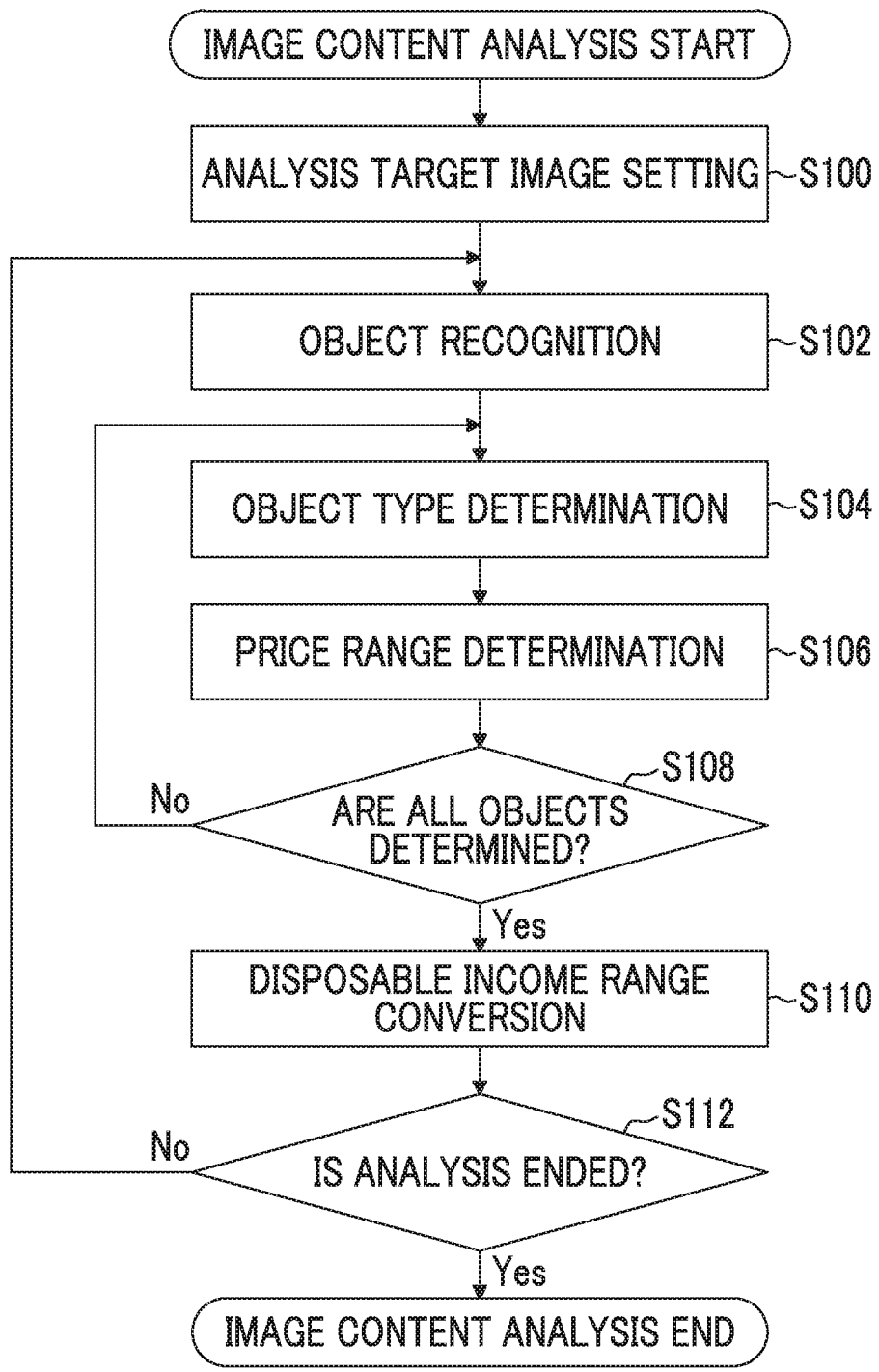
FIG. 5 is a flowchart illustrating a procedure of an image content analyzing step illustrated in FIG. 4.

FIG. 5 is a flowchart illustrating a procedure of an image content analyzing step illustrated in FIG. 4. In an analysis target image setting step S100, the object recognition unit 44 illustrated in FIG. 2 specifies an analysis target image group and extracts an analysis target image from the specified image group. That is, in the analysis target image setting step S100, the object recognition unit 44 removes an image that is not suitable for analysis.

In the analysis target image setting step S100, the object recognition unit 44 specifies a similar image group having similar image contents, such as an image group acquired by applying continuous shooting, extracts one image from the images included in the similar image group and removes remaining images. After the analysis target image setting step S100, the process proceeds to the object recognition step S102.

In the object recognition step S102, the object recognition unit 44 recognizes an object from the analysis target image. After the object recognition step S102, the process proceeds to an object type determination step S104.

In the object type determination step S104, the type determination unit 46 determines a type of the object with reference to a correspondence relationship between a defined object and the type of the object. For example, in a case where the object is mandarin orange, the type determination unit 46 determines the type of the object as a fruit.

In addition, in a case where the object is amber, the type determination unit 46 determines the type of the object as jewelry. After the object type determination step S104, the process proceeds to the price range determination step S106.

Figure 6:
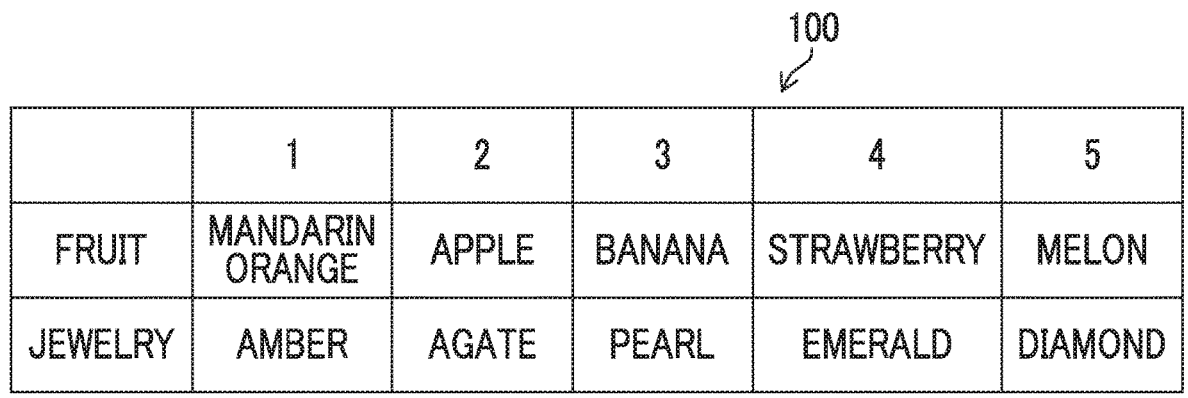
FIG. 6 is a schematic diagram illustrating an example of a price range determination table.

In the price range determination step S106, the type determination unit 46 determines a price range for each object with reference to the price range determination database 16A. FIG. 6 is a schematic diagram illustrating an example of a price range determination table.

The price range determination table 100 illustrated in FIG. 6 defines the price range of the object for each type of object. In FIG. 6, the price range is illustrated using numerical values from 1 to 5. The numerical values from 1 to 5 representing the price range illustrated in FIG. 6 can be converted into a numerical range representing the price range. FIG. 6 illustrates one object for each price range, but a plurality of objects can be included for one price range. After the price range determination step S106, the process proceeds to an undetermined object determination step S108.

In the undetermined object determination step S108, the server apparatus 12 determines whether or not the price range determination has been performed for all the objects. In the undetermined object determination step S108, in a case where the server apparatus 12 determines that there is an object whose price range has not been determined, the determination is No. In the case where the determination is No, the process proceeds to the object type determination step S104, and each step from the object type determination step S104 to the undetermined object determination step S108 is repeatedly performed until the determination in the undetermined object determination step S108 becomes Yes.

On the other hand, in the undetermined object determination step S108, in a case where the server apparatus 12 determines that the price range determination has been performed for all the objects, the determination is Yes. In the case where the determination is Yes, the process proceeds to the disposable income range conversion step S110.

In the disposable income range conversion step S110, the disposable income range conversion unit 50 refers to the disposable income range conversion database 16B and converts a price range determination result of each object into the disposable income range of the user.

Figure 7:
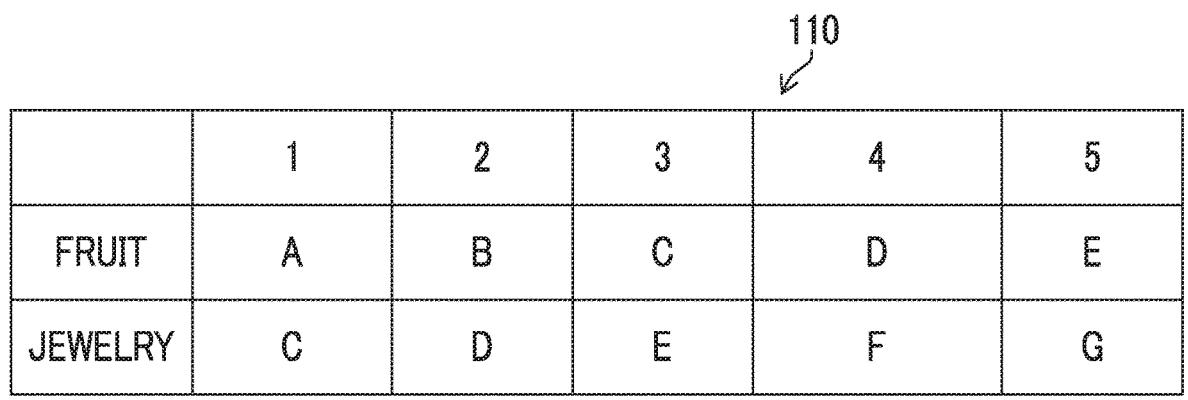
FIG. 7 is a schematic diagram illustrating an example of a disposable income range table.

FIG. 7 is a schematic diagram illustrating an example of a disposable income range table. In a disposable income range conversion table 110 illustrated in FIG. 7, alphabets from A to G are used to illustrate the disposable income range corresponding to the price range for each type of object. The alphabets A to G illustrated in FIG. 7 can be processed as the numerical values.

In a case where different price ranges are determined for a plurality of objects included in the same image, the disposable income range conversion unit 50 can derive the disposable income range of the user on the basis of defined priority. After the disposable income range conversion step S110, the process proceeds to the image content analysis end determination step S112.

In the image content analysis end determination step S112, the server apparatus 12 determines whether or not to end an image content analysis. In the image content analysis end determination step S112, in a case where the server apparatus 12 determines that processing of all the analysis target images has not been ended, the determination is No. In the case where the determination is No, the process proceeds to the object recognition step S102, and each step from the object recognition step S102 to the image content analysis end determination step S112 is repeatedly performed until the determination in the image content analysis end determination step S112 becomes Yes.

On the other hand, in the image content analysis end determination step S112, in a case where the server apparatus 12 determines that the processing of all the analysis target images has been ended, the determination is Yes. In the case where the determination is Yes, the server apparatus 12 ends the image content analyzing step S12 illustrated in FIG. 4.

Details of Accessory Information Analyzing Step

Figures 8, 9:
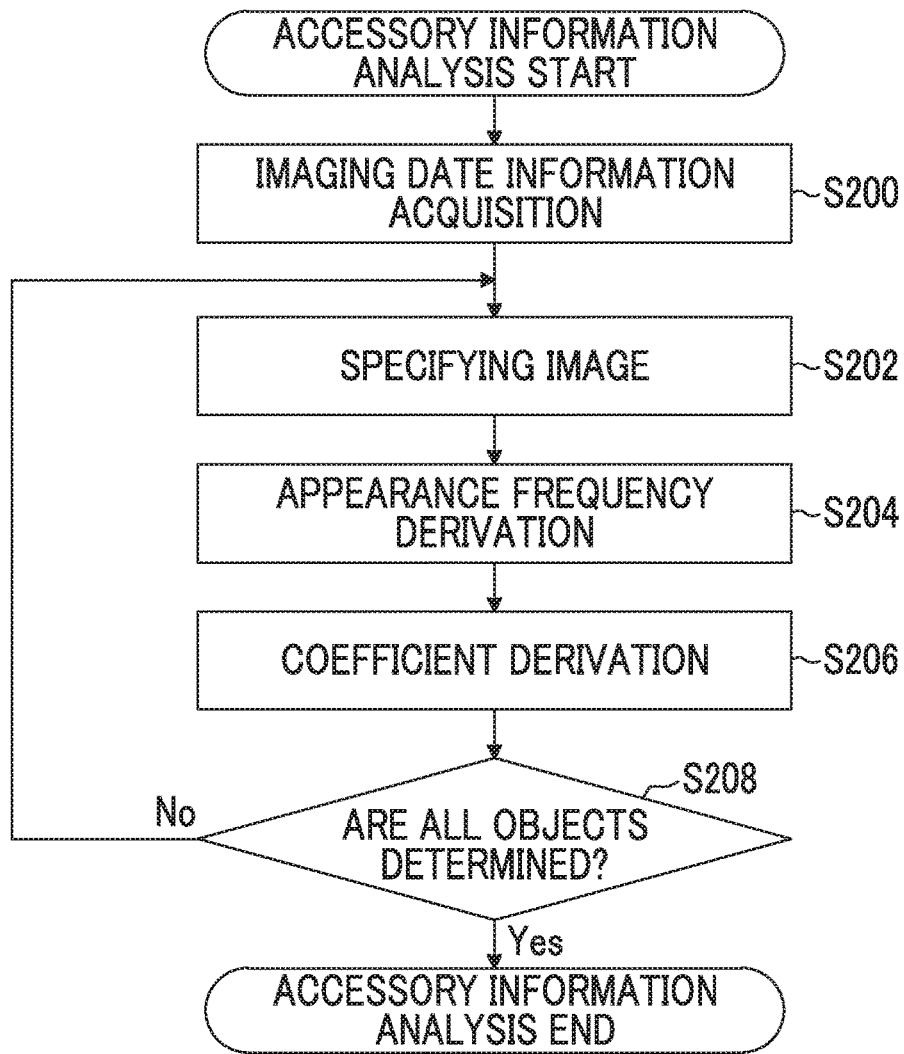
FIG. 8 is a flowchart illustrating a procedure of an accessory information analyzing step illustrated in FIG. 4.
FIG. 9 is a schematic diagram illustrating an example of a coefficient table.

FIG. 8 is a flowchart illustrating a procedure of an accessory information analyzing step illustrated in FIG. 4. In an imaging date information acquisition step S200, the accessory information acquisition unit 42 illustrated in FIG. 2 acquires imaging date information as accessory information. After the imaging date information acquisition step S200, the process proceeds to an image specifying step S202. The imaging date information acquisition step S200 described in the embodiment corresponds to an example of an accessory information acquisition step.

In the image specifying step S202, the frequency derivation unit 52 specifies an image for which the appearance frequency of the object is to be derived. That is, the frequency derivation unit 52 specifies a plurality of images including the same object for each object. After the image specifying step S202, the process proceeds to an appearance frequency derivation step S204.

In the appearance frequency derivation step S204, the frequency derivation unit 52 derives an appearance frequency of the object. An imaging cycle can be applied to the appearance frequency. The imaging cycle is a reciprocal number of an imaging period. In a case where two or more imaging cycles are derived for three or more images, the frequency derivation unit 52 can use a statistical value of the two or more imaging cycles as the imaging period. Examples of the statistical value include an average value, a median value, a maximum value, a minimum value, and the like. After the appearance frequency derivation step S204, the process proceeds to a coefficient derivation step S206.

In the coefficient derivation step S206, the coefficient derivation unit 54 derives a weighting coefficient for each object with reference to the weighting coefficient database 16C. FIG. 9 is a schematic diagram illustrating an example of a coefficient table.

A weighting coefficient table 120 illustrated in FIG. 9 represents a relationship between the appearance frequency and the weighting coefficient for each type of object. For example, in a case where the imaging cycle is six months, a weighting coefficient of fruit is 0.1. In the weighting coefficient table 120 illustrated in FIG. 9, in a case where the appearance frequency is relatively high, a relatively large weighting coefficient is defined. After the coefficient derivation step S206 illustrated in FIG. 8, the process proceeds to a coefficient derivation determination step S208.

In the coefficient derivation determination step S208, the server apparatus 12 determines whether or not the weighting coefficient has been derived for all the objects. In the coefficient derivation determination step S208, in a case where the server apparatus 12 determines that there is an object whose weighting coefficient has not been derived, the determination is No. In the case where the determination is No, the process proceeds to the image specifying step S202, and each step from the image specifying step S202 to the coefficient derivation determination step S208 is repeatedly performed until the determination in the coefficient derivation determination step S208 becomes Yes.

On the other hand, in the coefficient derivation determination step S208, in a case where the server apparatus 12 determines that the weighting coefficients have been derived for all the objects, the determination is Yes. In the case where the determination is Yes, the server apparatus 12 ends the accessory information analyzing step S14 illustrated in FIG. 4.

Further, in the present embodiment, an aspect in which the weighting coefficient for each object is set is exemplified, but the weighting coefficient may be set for each object.

Specific Example of Provision of Recommendation Information

Figure 10:
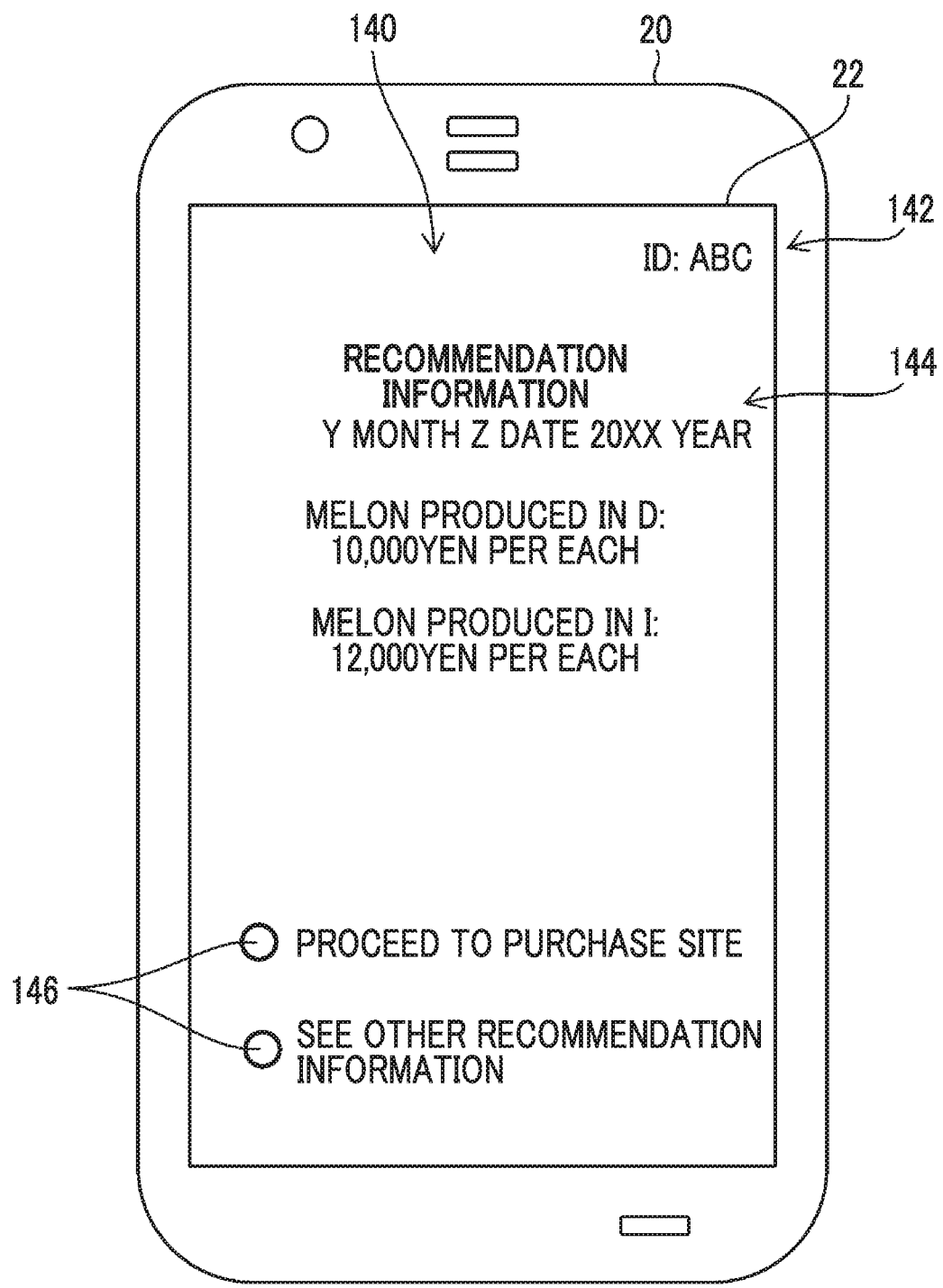
FIG. 10 is an explanatory diagram illustrating an example of a recommendation information display screen.

FIG. 10 is an explanatory diagram illustrating an example of a recommendation information display screen. The recommendation information display screen 140 is displayed using the display unit 22 of the user terminal apparatus 20. The recommendation information display screen 140 includes user identification information 142, recommendation information 144, and an operation button 146. The user can purchase a product included in the recommendation information 144 by operating the user terminal apparatus 20.

In a case where one analysis target image includes a plurality of objects, the disposable income of the user can be estimated for each object. In a case where a plurality of different disposable incomes is estimated for one user, a maximum value of an estimated value of the disposable income can be set as the disposable income of the user, and recommendation information can be provided.

In the case where the plurality of different disposable incomes is estimated for one user, the recommendation information may be provided for each of a plurality of estimated values of disposable income. Priorities may be set in advance for the types of objects, and the disposable income of the user may be estimated on the basis of the object having the highest priority.

Operation Effect of First Embodiment

The following operation effect can be obtained by the image processing system 10 and the recommendation information providing method according to the first embodiment.

[1] Recognize an object from an image, specify the type of the object, determine a price range for each type of object, and convert the price range for each type of object into a disposable income range. Further, for a plurality of images having the common object, an appearance frequency of the object is derived from imaging date information, and a weighting coefficient is derived on the basis of the appearance frequency of the object. The disposable income range is multiplied by the weighting coefficient to estimate the disposable income of the user. Thereby, it is possible to provide the recommendation information according to the disposable income estimated on the basis of the analysis result of the plurality of images.

[2] Recognize an article from an image as an object. Thus, the disposable income of the user can be estimated on the basis of the articles included in the image.

[3] The price range for each type of object is determined with reference to a price range determination table illustrating a relationship between the type of the object and the price range. As a result, a certain accuracy can be secured for the price range determination.

[4] The disposable income range is derived from the object price range with reference to the disposable income range table illustrating a relationship between the price range of the object and the disposable income range. As a result, a certain accuracy can be secured for the disposable income range conversion.

[5] A weighting coefficient is derived from an appearance frequency of the object with reference to a weighting coefficient table illustrating a relationship between the appearance frequency of the object and the weighting coefficient. As a result, a certain accuracy can be secured for the weighting coefficient.

In the present embodiment, in a derivation of the weighting coefficient, an aspect of referring to a table has been exemplified, but a deep learning model may be applied to processing such as the derivation of the weighting coefficient. For example, a learned model that has learned a conversion relationship between the appearance frequency of the object and the weighting coefficient can be applied to the coefficient derivation unit 54 illustrated in FIG. 2. The same applies to the type determination unit 46, the price range determination unit 48, and the disposable income range conversion unit 50.

In a case where a product or the like with a relatively higher price or a product with a relatively lower price range is selected than a product or the like included in the recommendation information provided to the user, the image processing system 10 may perform learning using information on a product purchased by the user as a learning data, and may update a parameter related to estimation of the disposable income and a parameter related to a provision of the recommendation information.

Image Processing System According to Second Embodiment

Next, an image processing system according to a second embodiment will be described. An image processing system 200 according to the second embodiment determines whether the object is belongings of the user or a rental item, and provides recommendation information according to the determination result.

Configuration Example of Server Apparatus

Figure 11:
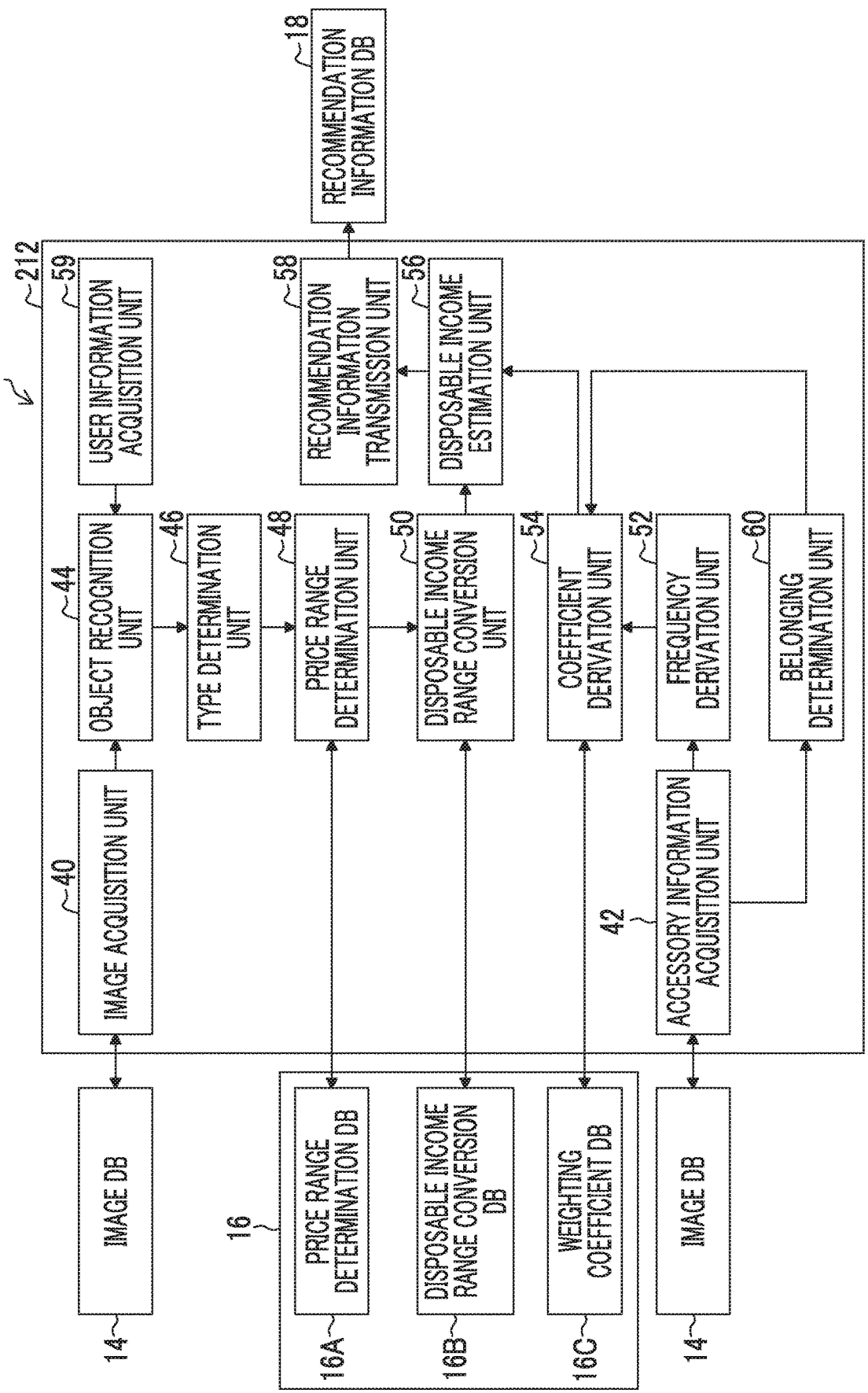
FIG. 11 is a functional block diagram of a server apparatus according to a second embodiment.

FIG. 11 is a functional block diagram of a server apparatus according to a second embodiment. The server apparatus 212 is different from the server apparatus 12 illustrated in FIG. 2 in that a belonging determination unit 60 is added. The belonging determination unit 60 determines whether the object is belongings of the user or a rental item, using the imaging date information.

For example, the belonging determination unit 60 can determine an object that reappears after an imaging date of one or more days as belongings of the user and, in a case where the object does not reappear, as a rental item. That is, the belonging determination unit 60 can determine whether the object is belongings of the user or a rental item according to the imaging period of the object and the appearance frequency of the object.

The server apparatus 12 may transmit both recommendation information of the purchased item and recommendation information of the rental item to the user terminal apparatus 20 without determining whether the object is belongings of the user or a rental item.

Configuration Example of Recommendation Information Providing Method

Figure 12:
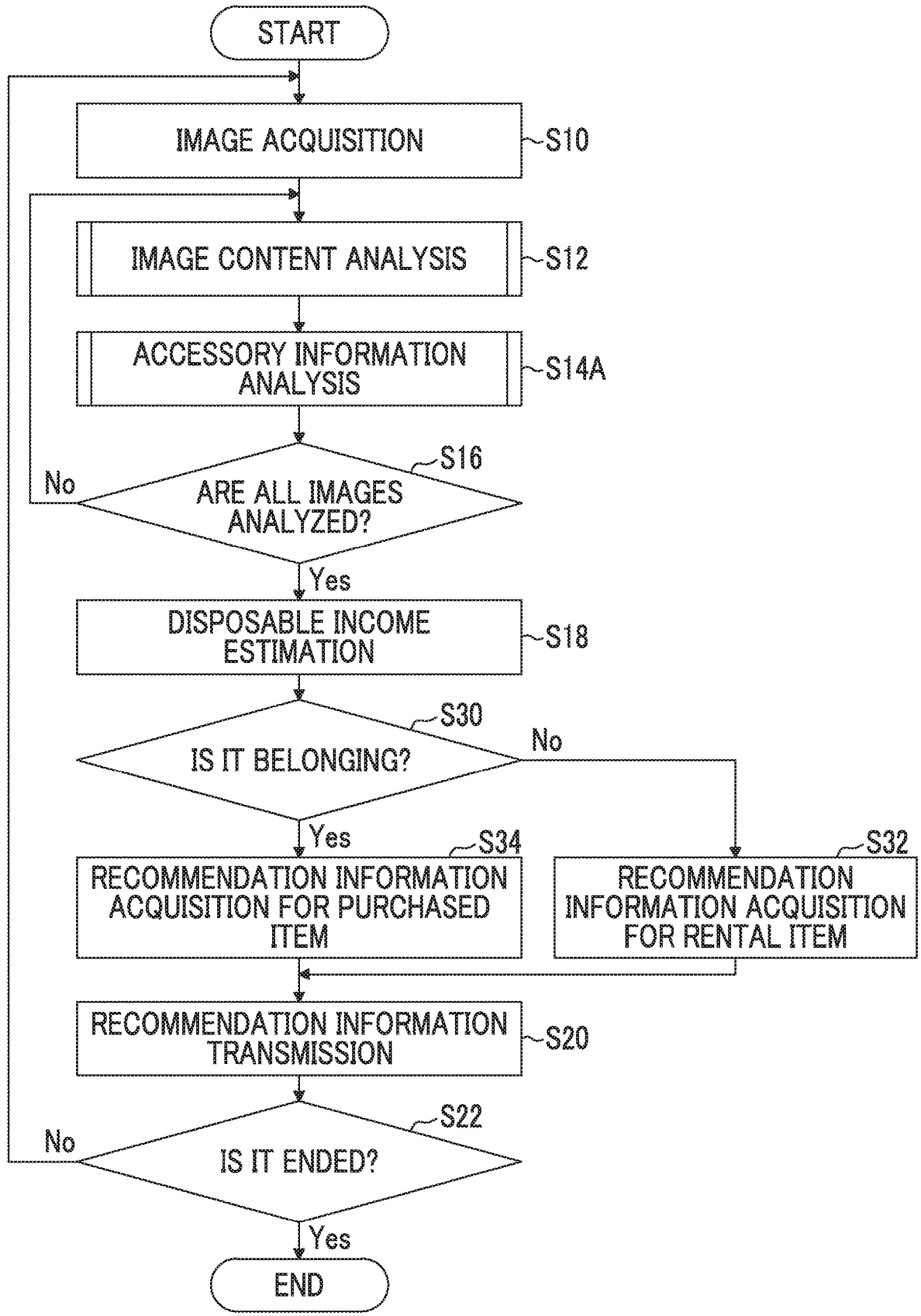
FIG. 12 is a flowchart illustrating a procedure of a recommendation information providing method according to the second embodiment.

FIG. 12 is a flowchart illustrating a procedure of a recommendation information providing method according to the second embodiment. The flowchart illustrated in FIG. 12 is different from the flowchart illustrated in FIG. 4 in that the accessory information analyzing step S14 is changed to the accessory information analyzing step S14A.

In addition, the flowchart illustrated in FIG. 12 is different from the flowchart illustrated in FIG. 4 in that a belonging determination step S30, a recommendation information acquisition step S32 for a rental item, and a recommendation information acquisition step S34 for a purchased item are added.

The image acquisition step S10 and the image content analyzing step S12 are the same as the recommendation information providing method according to the first embodiment illustrated in FIG. 4. In the accessory information analyzing step S14A illustrated in FIG. 12, the belonging determination unit 60 specifies, for each object, whether the object is belongings of the user or a rental item using information on the imaging date of each image.

Figure 13:
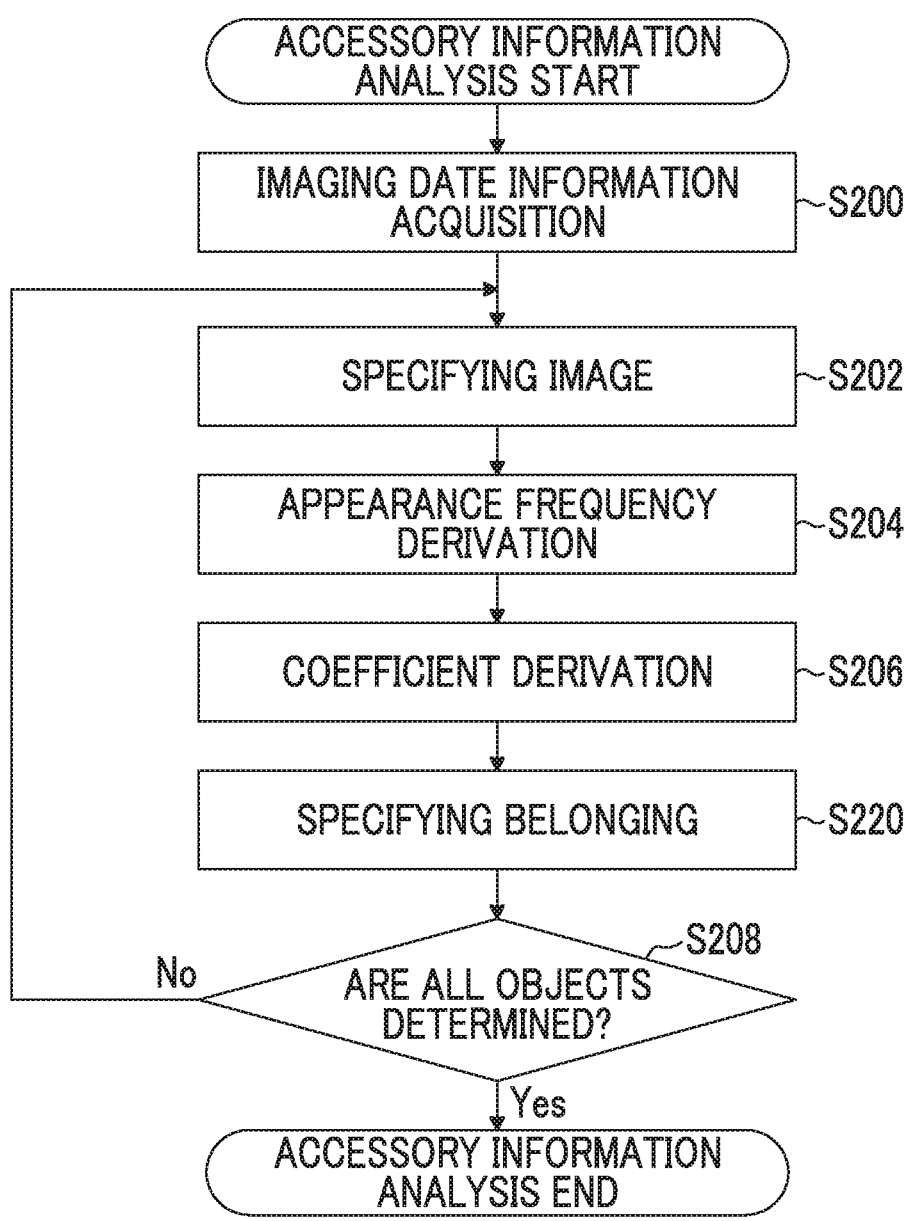
FIG. 13 is a flowchart illustrating a procedure of an accessory information analyzing step illustrated in FIG. 12.

FIG. 13 is a flowchart illustrating a procedure of an accessory information analyzing step illustrated in FIG. 12. The flowchart illustrated in FIG. 13 is different from the flowchart illustrated in FIG. 8 in that a belonging specifying step S220 is added.

In the belonging specifying step S220, the belonging determination unit 60 specifies, for each object, whether the object is belongings of the user or a rental item. After the belonging specifying step S220, the process proceeds to the coefficient derivation determination step S208. In a case where processing of the coefficient derivation determination step S208 is performed and a defined condition is satisfied, the server apparatus 12 ends the accessory information analyzing step S14A illustrated in FIG. 12.

Returning to FIG. 12, after the accessory information analyzing step S14A, the process proceeds to the analysis end determination step S16. The analysis end determination step S16 and the disposable income estimation step S18 are the same as the analysis end determination step S16 and the disposable income estimation step S18 illustrated in FIG. 4.

After the disposable income estimation step S18, the process proceeds to the belonging determination step S30. In the belonging determination step S30, the belonging determination unit 60 illustrated in FIG. 11 determines whether the object is belongings of the user or a rental item.

In the belonging determination step S30, in a case where the belonging determination unit 60 determines that the object is a rental item, the determination is No. In the case where the determination is No, the process proceeds to the recommendation information acquisition step S32 for the rental item.

In the recommendation information acquisition step S32 for the rental item, the recommendation information transmission unit 58 refers to the recommendation information database 18 to acquire recommendation information for the rental item. After the recommendation information acquisition step S32 for the rental item, the process proceeds to the recommendation information transmission step S20.

On the other hand, in the belonging determination step S30, in a case where the belonging determination unit 60 determines that the object is belongings of the user, the determination is Yes. In the case where the determination is Yes, the process proceeds to the recommendation information acquisition step S34 for the purchased item.

In the recommendation information acquisition step S34 for the purchased item, the recommendation information transmission unit 58 refers to the recommendation information database 18 to acquire recommendation information for the purchased item. After the recommendation information acquisition step S34 for the purchased item, the process proceeds to the recommendation information transmission step S20.

In the recommendation information transmission step S20, the recommendation information transmission unit 58 transmits the recommendation information for the purchased item to the user terminal apparatus 20 in a case where the object is belongings of the user. On the other hand, in the recommendation information transmission step S20, in a case where the object is a rental item, the recommendation information transmission unit 58 transmits recommendation information for the rental item to the user terminal apparatus 20.

After the recommendation information transmission step S20, the process proceeds to an end determination step S22. The end determination step S22 illustrated in FIG. 12 is the same as the end determination step S22 illustrated in FIG. 4.

Example of Providing Recommendation Information

Figure 14:
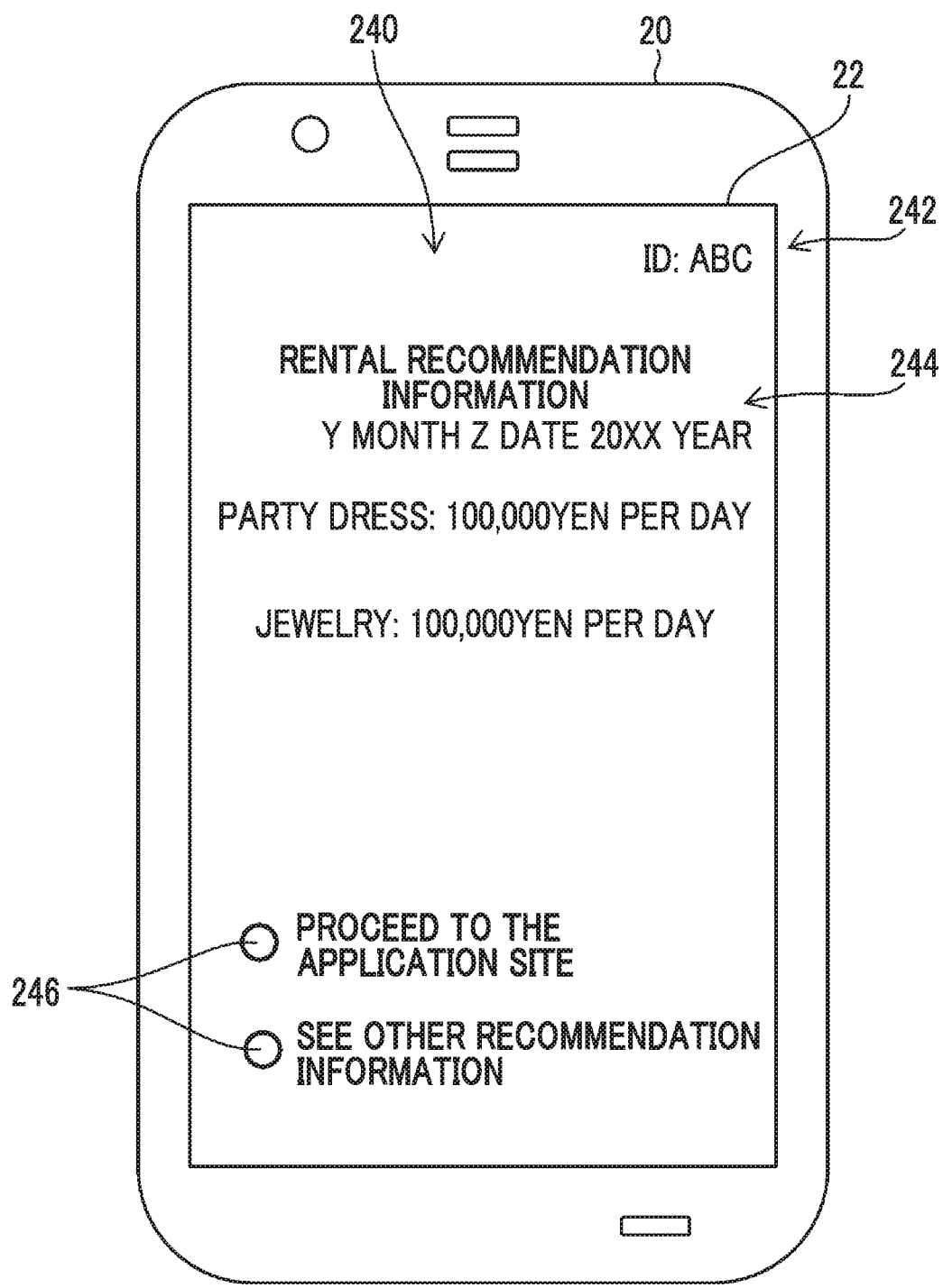
FIG. 14 is an explanatory diagram illustrating an example of a recommendation information display screen of a rental item.

FIG. 14 is an explanatory diagram illustrating an example of a recommendation information display screen of a rental item. A recommendation information display screen 240 illustrated in FIG. 14 includes user identification information 242, recommendation information 244 for a rental item, and an operation button 246.

The user identification information 242 illustrated in FIG. 14 is the same as the user identification information 142 illustrated in FIG. 10.

The operation buttons 246 illustrated in FIG. 14 are the same as the operation button 146 illustrated in FIG. 10.

Operation Effect of Second Embodiment

The following operation effect can be obtained by the image processing system 200 and the recommendation information providing method according to the second embodiment.

[1] Determine whether the object is belongings of the user or a rental item. In a case where the object is a rental item, information on the rental item is provided as recommendation information to the user. Thereby, the user can acquire recommendation information on the rental item.

[2] In a case where the object is belongings of the user, information on the purchased item is provided as recommendation information to the user. Thereby, the user can acquire recommendation information on the purchased item.

Image Processing System According to Third Embodiment

Outline

Next, an image processing system according to a third embodiment will be described. The image processing system 300 according to the third embodiment specifies an imaging scene from an analysis result of image contents, and recognizes an event based on the imaging scene.

The image processing system 300 estimates a disposable income of the user on the basis of the event, and provides recommendation information related to the image event to the user on the basis of the disposable income of the user. Hereinafter, a difference between the image processing system 300 according to the third embodiment and the image processing system 10 according to the first embodiment will be mainly described.

Figure 15:
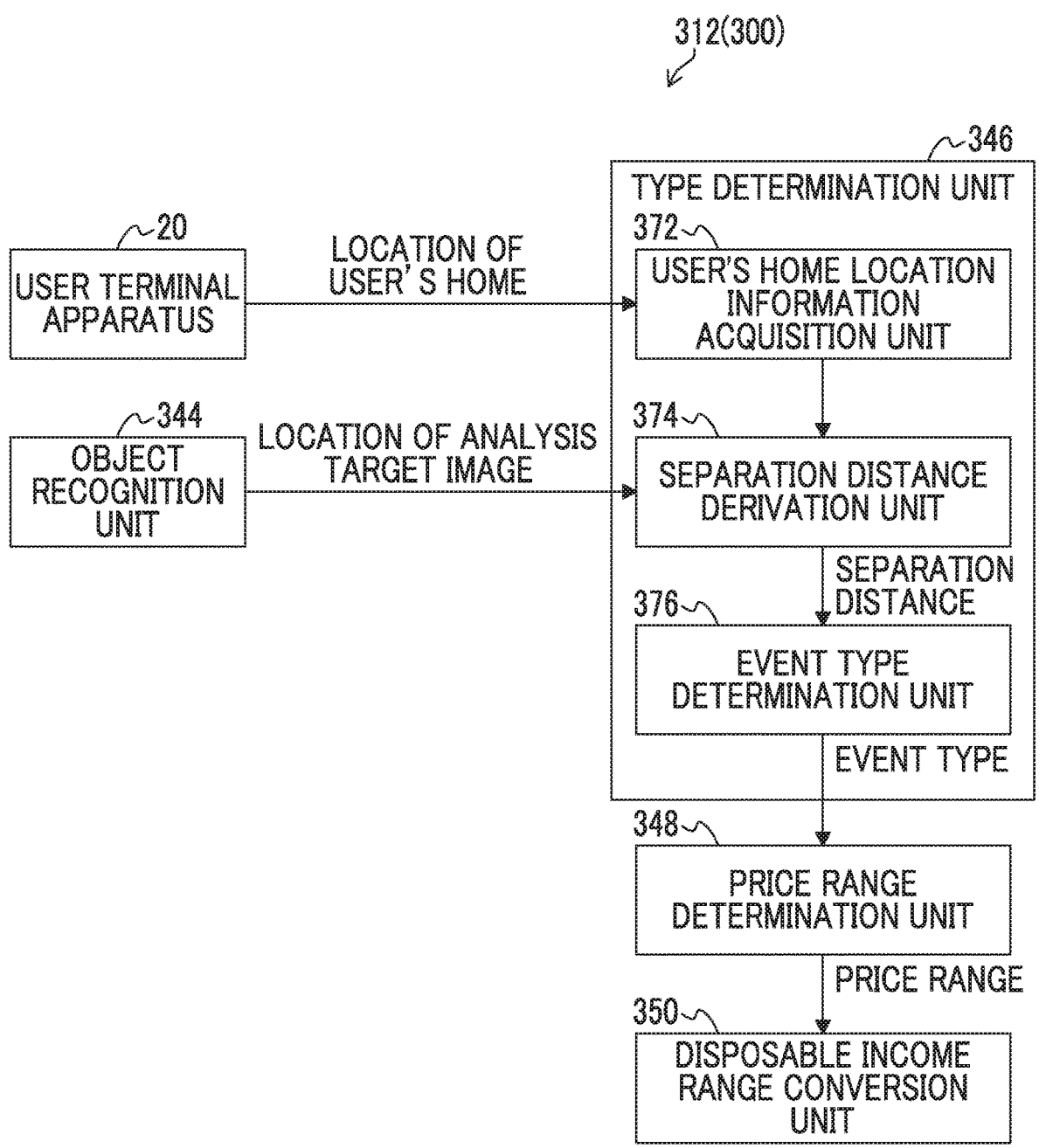
FIG. 15 is a functional block diagram illustrating a configuration example of a type determination unit applied to an image processing system according to a third embodiment.

FIG. 15 is a functional block diagram of a server apparatus applied to an image processing system according to the third embodiment. FIG. 15 extracts and illustrates a configuration of the server apparatus 312 that has a different function from the server apparatus 12 illustrated in FIG. 2.

Object Recognition Unit

An object recognition unit 344 illustrated in FIG. 15 recognizes an imaging scene of the analysis target image as an object of the analysis target image. Specifically, the imaging scene of the analysis target image is specified, and a location of the analysis target image is specified.

Examples of the location of the analysis target image include a tourist spot, a restaurant, a school, and the like. A place name, an address, latitude and longitude, and the like can be applied to the location of the analysis target. A common name and an old place name may be applied to the place name. The object recognition unit 344 transmits a recognition result of the object of the analysis target image to a type determination unit 346.

An imaging location of the analysis target image can be applied to the location of the analysis target image. The object recognition unit 344 can acquire information on the imaging location included in accessory information and recognize the imaging location of the analysis target image as an object of the analysis target image. The object recognition unit described in the embodiment corresponds to an example of an imaging location information acquisition unit that acquires the imaging location information.

Type Determination Unit

The type determination unit 346 determines a type of event represented by the analysis target image as a type of the object using the recognition result of the object of the analysis target image transmitted from the object recognition unit 344.

Examples of the type of event include traveling, visiting theme parks, eating at restaurants, school events such as athletic meetings, sports events such as watching sports, and beauty services at beauty salons.

FIG. 15 exemplifies an aspect in which a separation distance that is a distance between a user's home and a location of the analysis target image is derived, and a type of event is specified on the basis of the separation distance as an example of the type determination unit 346. That is, the type determination unit 346 comprises a user's home location information acquisition unit 372, a separation distance derivation unit 374, and an event type determination unit 376.

The user's home location information acquisition unit 372 acquires user's home information. FIG. 15 exemplifies an aspect in which the user's home information of the user transmitted from the user terminal apparatus 20 is acquired. The user's home location information acquisition unit 372 transmits the user's home information to the separation distance derivation unit 374.

The separation distance derivation unit 374 derives the distance from the user's home to the location of the analysis target image using the user's home information and analysis target image location information representing the location of the analysis target image.

The event type determination unit 376 determines the type of event on the basis of the location of the analysis target image and the distance from the user's home to the location of the analysis target image. For example, in a case where the distance from the user's home to the location of the analysis target image is equal to or more than a defined distance, and the same location as the analysis target image is continuously imaged for two or more days, the event type determination unit 376 determines that the type of event is travel.

In a case where the location of the analysis target image does not satisfy the above-described travel condition, but the location is included in a defined theme park list, the event type determination unit 376 may determine that the type of event is a visit to the theme parks.

In a case where a school included in a defined school list is recognized as an object, the event type determination unit 376 can determine the type of event as a school event. In a case where a stadium or the like included in a defined sports watching list is recognized as an object, the event type determination unit 376 can determine the type of event as watching sports.

That is, an event type list that defines a relationship between the imaging scene and the event type for each user is created and stored in advance. The event type determination unit 376 can specify the type of event for the imaging scene with reference to the event type list for each user. The event type determination unit 376 transmits determination information on the type of event to the price range determination unit 348.

FIG. 16 is a schematic diagram of a price range determination table applied to the image processing system according to the third embodiment. A price range determination table 370 illustrated in FIG. 16 defines the price range of the object for each type of object. In FIG. 16, the price range is represented using numerical values from 1 to 5. The numerical values from 1 to 5 representing the price range illustrated in FIG. 17 can be converted into a numerical range representing the price range.

The price range determination table 370 illustrated in FIG. 16 applies a positional relationship between the user's home and the location of the analysis target image as rank in a case where the type of event is travel. The same prefectures are applied to first rank. The same regions are applied to second rank. Adjacent regions are applied to third rank.

Domestic non-adjacent regions are applied to fourth rank. Overseas is applied to fifth rank. The distance from the user's home to the location of the analysis target image may be applied to the positional relationship between the user's home and the location of the analysis target image.

In a case where the type of event is a visit to theme parks, the price range determination table 370 may apply defined rank to each theme park in advance. Alphabets from P to T in the price range determination table 370 illustrated in FIG. 17 represents the name of the theme park.

In a case where the theme park is P, the price range determination table 370 is applied to the first rank. In a case where the theme parks are Q, R, S, and T, the price range determination table 370 is applied to the second, third, fourth, and fifth ranks are applied, respectively.

The price range determination unit 348 illustrated in FIG. 15 transmits price range information to the disposable income range conversion unit 350. The disposable income range conversion unit 350 converts the price range information into disposable income range information of the user.

The disposable income range conversion unit 350 refers to the disposable income range conversion table 380 illustrated in FIG. 17 in a case of converting the price range information into the disposable income range information of the user.

FIG. 17 is a schematic diagram of a disposable income range conversion table applied to the image processing system according to the third embodiment. In the disposable income range conversion table 380 illustrated in FIG. 17, the disposable income range information corresponding to price range information is illustrated using alphabets from A to G. The alphabets A to G illustrated in FIG. 18 can be processed as the numerical values. The alphabets from A to G illustrated in FIG. 17 may be a numerical range different from the alphabets from A to G illustrated in FIG. 7.

The disposable income range conversion unit 350 illustrated in FIG. 15 transmits the disposable income range information to the disposable income estimation unit 56. The disposable income estimation unit is the same as the disposable income estimation unit 56 illustrated in FIG. 2. The disposable income estimation unit estimates a disposable income of the user using the disposable income range information and the weighting coefficient. In FIG. 15, the illustration of the disposable income estimation unit is omitted.

The server apparatus 312 illustrated in FIG. 15 comprises a frequency derivation unit and a coefficient derivation unit. The frequency derivation unit is the same as the frequency derivation unit 52 illustrated in FIG. 2. In addition, the coefficient derivation unit is the same as the coefficient derivation unit 54 illustrated in FIG. 2. In FIG. 15, the illustrations of the frequency derivation unit and the coefficient derivation unit are omitted.

The frequency derivation unit derives an occurrence frequency of the event using the imaging date of a plurality of images of the same imaging scene. The coefficient derivation unit derives the weighting coefficient on the basis of the occurrence frequency of the event. In a case of deriving the weighting coefficient, the coefficient derivation unit refers to a weighting coefficient table 390 illustrated in FIG. 18.

FIG. 18 is a schematic diagram of a weighting coefficient table applied to the image processing system according to the third embodiment. FIG. 18 illustrates the weighting coefficient table 390 that defines a weighting coefficient in a case where the type of event is travel and a weighting coefficient in a case where the type of event is a visit to the theme parks.

In the weighting coefficient table 390 illustrated in FIG. 18, an event having a relatively high appearance frequency is defined by a relatively large weighting coefficient. An event having a relatively low appearance frequency is defined by a relatively small weighting coefficient.

In the weighting coefficient table 390, an event at a place relatively close to a user's home is defined by a relatively small weighting coefficient. On the other hand, in the weighting coefficient table 390, an event at a place relatively far from a user's home is defined by a relatively large weighting coefficient.

The server apparatus 312 illustrated in FIG. 15 comprises a recommendation information transmission unit. The recommendation information transmission unit is the same as the recommendation information transmission unit 58 illustrated in FIG. 2. In FIG. 15, the illustration of the recommendation information transmission unit is omitted. The recommendation information transmission unit transmits recommendation information according to the disposable income of the user. The recommendation information transmission unit may transmit the recommendation information in consideration of a type of event.

Another Aspect of User's Home Location Information Acquisition of User

Figure 19:
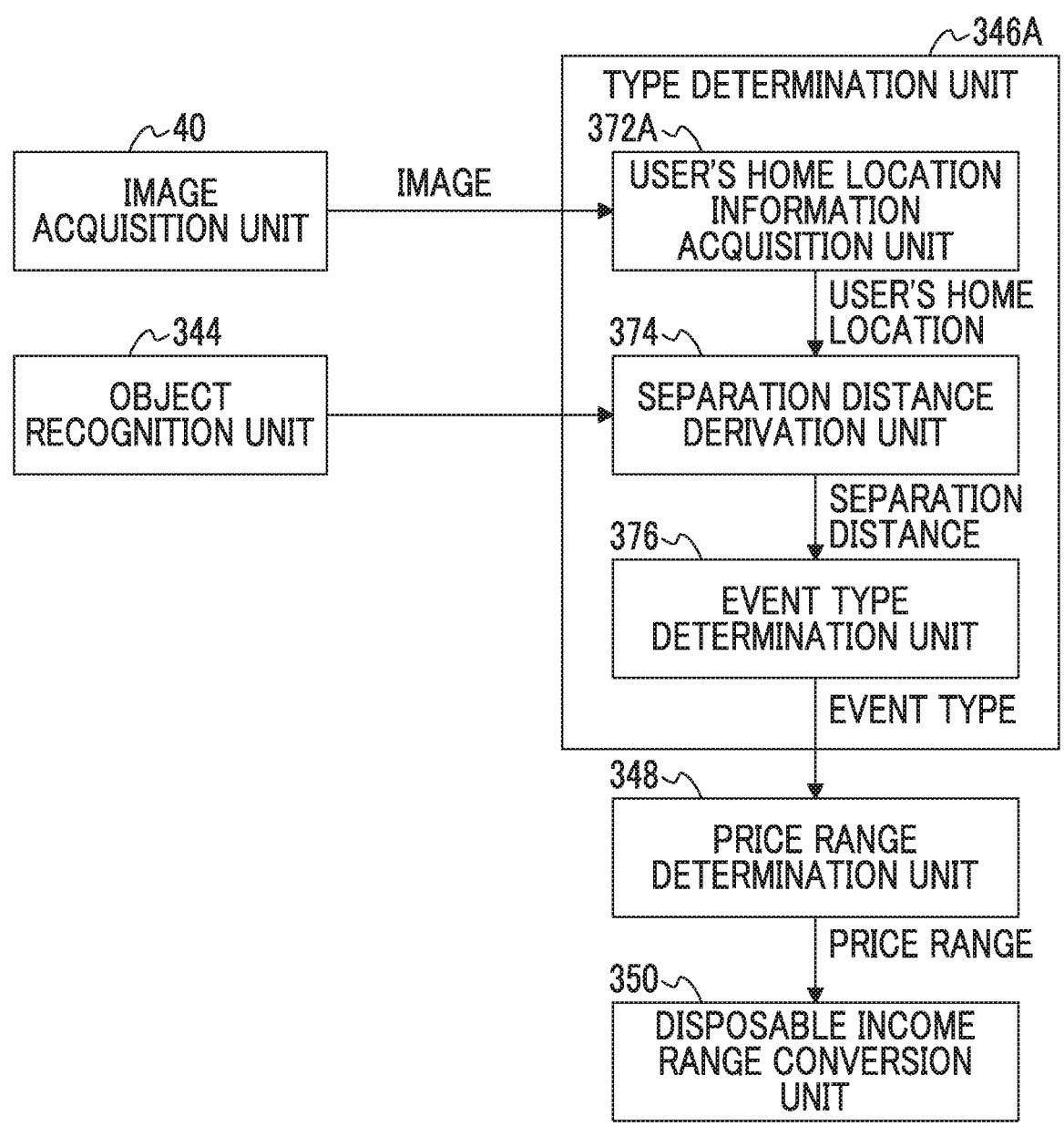
FIG. 19 is a functional block diagram of a type determination unit illustrating another aspect of a user's home location information acquisition.

FIG. 19 is a functional block diagram of a type determination unit illustrating another aspect of a user's home location information acquisition. A user's home location information acquisition unit 372A included in a type determination unit 346A illustrated in FIG. 19 analyzes image contents of one or more images in an analysis target image group acquired using the image acquisition unit 40, and specifies the user's home. That is, the user's home location information acquisition unit 372A specifies an image whose imaging location is the user's home from the analysis target image group, and specifies a user's home location using GPS information or the like included in accessory information on the specified image.

The user's home location information acquisition unit 372A can extract a characteristic region of each image from the analysis target image group, and specify an image that the user's home is captured with reference to a user's home characteristic region list that the characteristic region is defined in the image of the user's home.

According to the aspect, even in a case where user's home location information cannot be acquired from the user terminal apparatus 20, the user's home location information can be acquired on the basis of the analysis result of the analysis target image group.

In a case where an imaging frequency a characteristic region having the same feature is high, the user's home location information acquisition unit 372A may determine that the image of the user's home is captured. In addition, it may be determined whether or not the image is the image capturing the user's home in consideration of the number of imaging operations, an imaging date, and an imaging time.

In addition, the user's home described in the embodiment corresponds to an example of a reference location. A random location designated by the user in advance, such as a workplace or a school, can be applied to another example of the reference location. Further, the user's home location information acquisition unit 372A corresponds to an example of a reference location specification unit that specifies the reference location.

Recommendation Information Providing Method According to Third Embodiment

Next, a recommendation information providing method according to the third embodiment will be described. A procedure of the recommendation information providing method according to the third embodiment is different from the procedure of the recommendation information providing method according to the first embodiment in an object type determination step S104 illustrated in FIG. 5.

Figure 20:
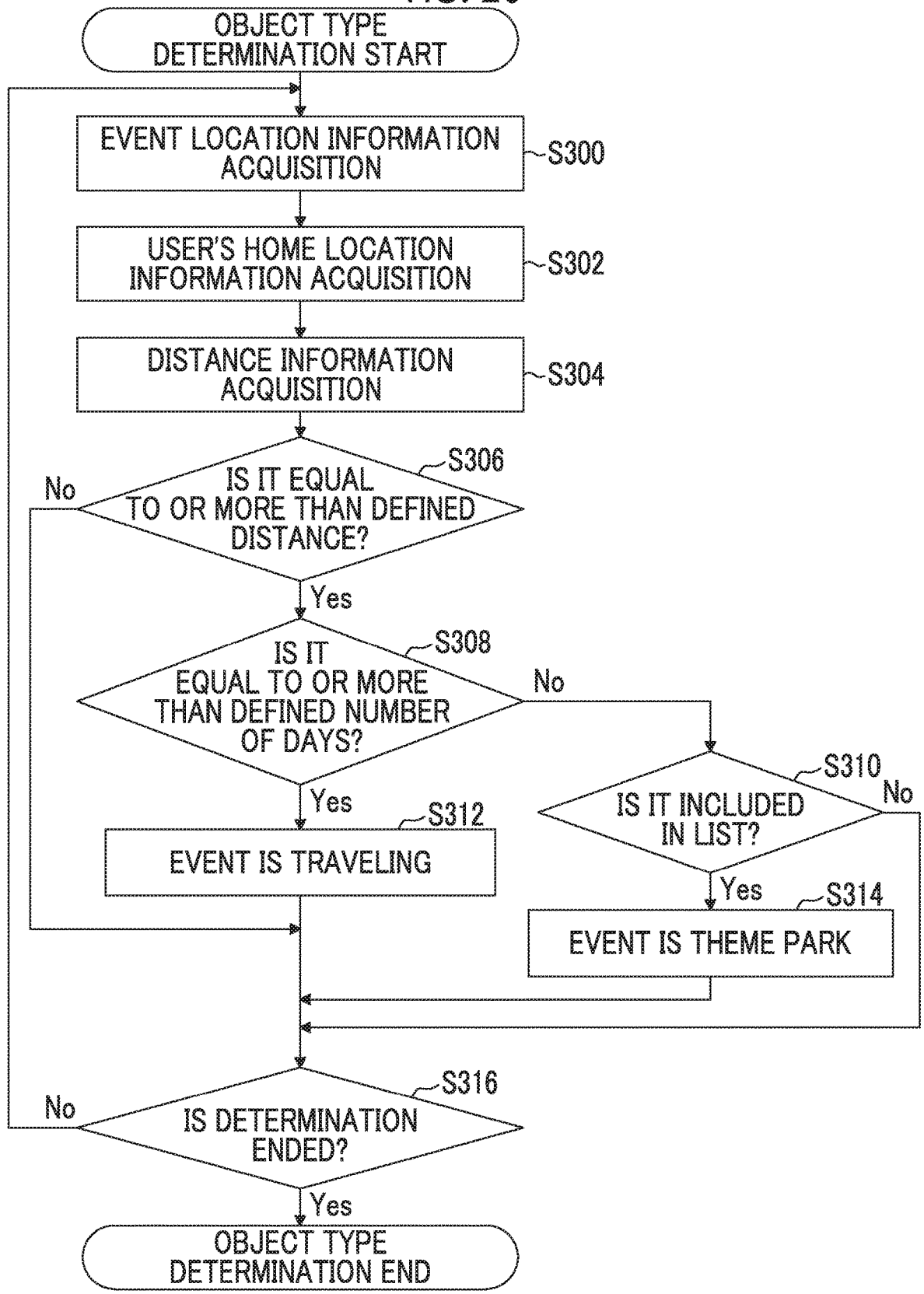
FIG. 20 is a flowchart illustrating a procedure of an object type determination step applied to a recommendation information providing method according to the third embodiment.

FIG. 20 is a flowchart illustrating a procedure of an object type determination step applied to a recommendation information providing method according to the third embodiment. FIG. 20 exemplifies the object type determination step of determining whether the event is travel or a visit to theme parks.

In an event location acquisition step S300, the object recognition unit 344 illustrated in FIG. 15 analyzes an image content of the analysis target image and specifies a location of the event. After the event location acquisition step S300, the process proceeds to a user's home location information acquisition S302.

In the user's home location information acquisition S302, the user's home location information acquisition unit 372 acquires user's home location information of the user. After the user's home location information acquisition S302, the process proceeds to a distance information acquisition step S304.

In the distance information acquisition step S304, the separation distance derivation unit 374 acquires information on the distance from the user's home to the location of the analysis target image. After the distance information acquisition step S304, the process proceeds to a distance determination step S306.

In the distance determination step S306, the event type determination unit 376 determines whether or not the distance from the user's home to the location of the analysis target image is equal to or more than a defined distance. In the distance determination step S306, in a case where the event type determination unit 376 determines that the distance from the user's home to the location of the analysis target image is less than a defined distance, the determination is No. In the case where the determination is No, the process proceeds to an end determination step S316.

On the other hand, in the distance determination step S306, in a case where the event type determination unit 376 determines that the distance from the user's home to the location of the analysis target image is more than or equal to a defined distance, the determination is Yes. In the case where the determination is Yes, the process proceeds to a number-of-days determination step S308.

In the number-of-days determination step S308, the event type determination unit 376 determines whether or not there is an image capturing the same event captured over two or more consecutive days. In the number-of-days determination step S308, in a case where the event type determination unit 376 determines that there is no image capturing the same event captured over two or more consecutive days, the determination is No. In the case where the determination is No, the process proceeds to a theme park list collation step S310.

On the other hand, in the number-of-days determination step S308, in a case where the event type determination unit 376 determines that there is the image capturing the same event captured over two or more consecutive days, the determination is Yes. In the case where the determination is Yes, the process proceeds to a travel determination step S312. In the travel determination step S312, the event type determination unit 376 determines that the event of the analysis target image is travel, and transmits the determination result to the price range determination unit 348. After the travel determination step S312, the process proceeds to the end determination step S316.

In the theme park list collation step S310, the event type determination unit 376 determines whether or not the location of the analysis target image is included in a defined theme park list. In the theme park list collation step S310, in a case where the event type determination unit 376 determines that the location of the analysis target image is not included in a defined theme park list, the determination is No. In the case where the determination is No, the process proceeds to an end determination step S316.

On the other hand, in the theme park list collation step S310, in a case where the event type determination unit 376 determines that the location of the analysis target image is included in a defined theme park list, the determination is Yes. In the case where the determination is Yes, the process proceeds to a theme park determination S314.

In the theme park determination S314, the event type determination unit 376 determines that the event of the analysis target image is a visit to the theme park, and transmits the determination result to the price range determination unit 348. After the theme park determination S314, the process proceeds to the end determination step S316.

In the end determination step S316, it is determined whether or not to end the object type determination step S104 illustrated in FIG. 5. In the end determination step S316, in a case where the type determination unit 346 determines that the type determination unit 346 does not satisfy a defined end condition, the determination is No. In the case where the determination is No, the process proceeds to the event location acquisition step S300. Thereafter, each step from the event location acquisition step S300 to the end determination step S316 is repeatedly performed until the determination in the end determining step S316 becomes Yes.

On the other hand, in the end determination step S316, in a case where the type determination unit 346 determines that the type determination unit 346 satisfies a defined end condition, the determination is Yes. In the case where the determination is Yes, the type determination unit 346 ends the object type determination step S104.

Operation Effect of Third Embodiment

The following operation effect can be obtained by the image processing system and the recommendation information providing method according to the third embodiment.

[1] An event is specified as an object of the analysis target image. Accordingly, it possible to estimate the disposable income of the user based on the event.

[2] A type of event is specified on the basis of a distance between a user's home and a location of event. It is possible to estimate the disposable income of the user based on the type of event.

Modification Example

Figure 21:
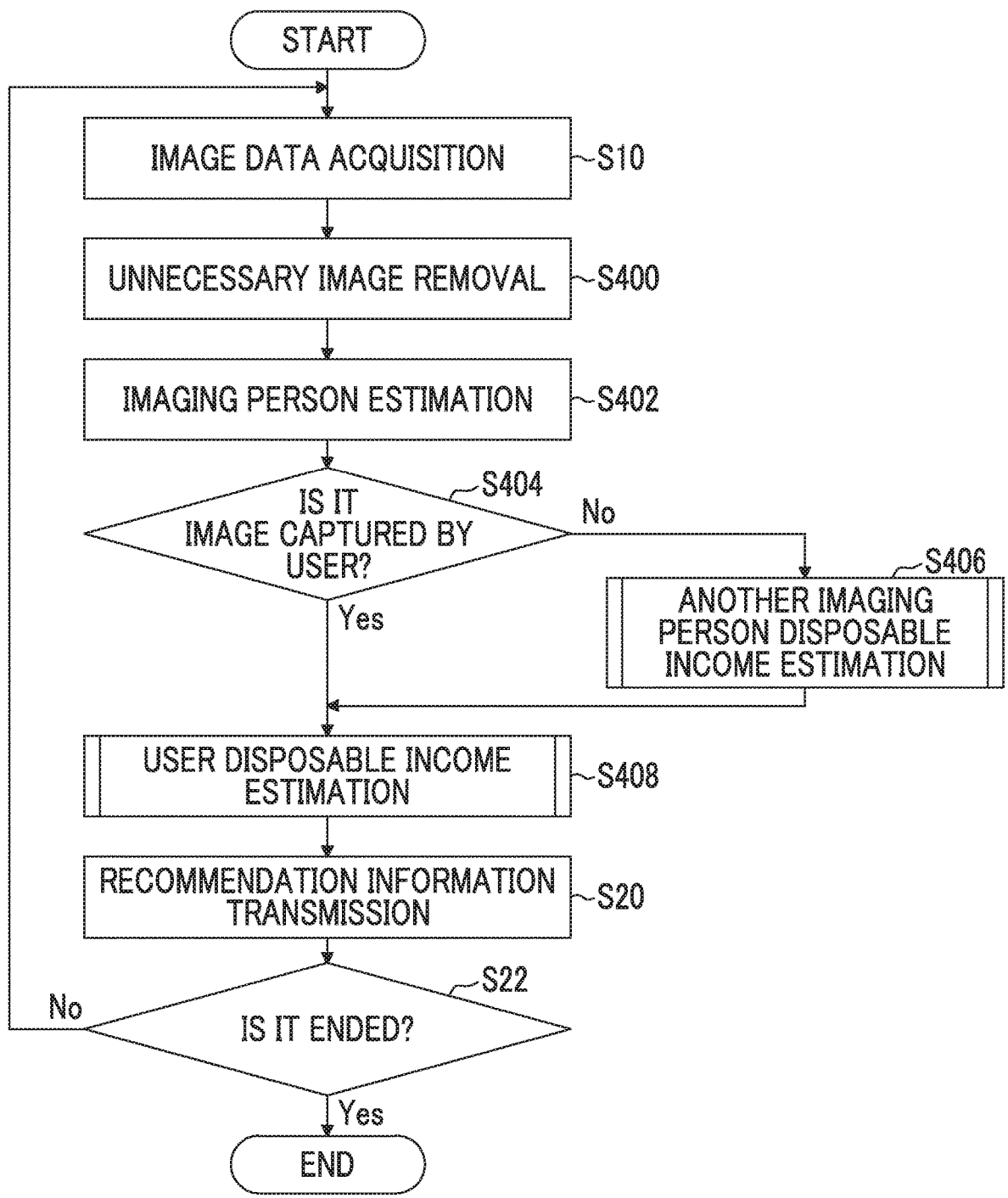
FIG. 21 is a flowchart illustrating a procedure of an object type determination step applied to a recommendation information providing method according to the third embodiment.

Next, a modification example according to the above-described image processing system and recommendation information providing method will be described. FIG. 21 is a flowchart illustrating a procedure of a recommendation information providing method according to the modification example. The recommendation information providing method according to the modification example described below estimates an imaging person for each analysis target image in the analysis target image group, and estimates a disposable income for each imaging person. In a case of estimating the disposable income of the user, an estimated value of a disposable income of another imaging person is used.

The image acquisition step S10 is the same as the image acquisition step S10 illustrated in FIG. 4. After the image acquisition step S10, the process proceeds to an unnecessary image removing step S400. In the unnecessary image removing step S400, the object recognition unit 44 illustrated in FIG. 2 performs the same processing as a removal of an image that is not suitable for analysis in the analysis target image setting step S100 illustrated in FIG. 5. After the unnecessary image removing step S400, the process proceeds to an imaging person estimation step S402.

In the imaging person estimation step S402, the object recognition unit 44 estimates an imaging person of the analysis target image. For example, using the information on an imaging apparatus of each image, it is estimated whether the image is an image captured by a user or an image captured by another person other than the user.

The object recognition unit 44 can estimate an image captured using an imaging apparatus having a high imaging frequency as an image captured by the user. After the imaging person estimation step S402, the process proceeds to an image determination step S404.

In the image determination step S404, the object recognition unit 44 determines whether the imaging person is a user or the imaging person is another person other than the user for each of the analysis target images. In the image determination step S404, in a case where the object recognition unit 44 determines that the imaging person of the analysis target image is other than the user, the determination is No. In the case where the determination is No, the process proceeds to another imaging person disposable income estimation step S406.

In the another imaging person disposable income estimation step S406, the disposable income estimation unit 56 and the like perform each step from the image content analyzing step S12 to the disposable income estimation step S18 illustrated in FIG. 4 for the imaging person other than the user to estimate the disposable income of another imaging person. After the disposable income estimation step S406, the process proceeds to a disposable income estimation step S408.

On the other hand, in the image determination step S404, in a case where the object recognition unit 44 determines that the imaging person of the analysis target image is the user, the determination is Yes. In the case where the determination is Yes, the process proceeds to the user disposable income estimation step S408.

In the user disposable income estimation step S408, the disposable income estimation unit 56 and the like perform each step from the image content analyzing step S12 to the disposable income estimation step S18 illustrated in FIG. 4 for the user to estimate the disposable income of the user.

The disposable income estimation unit 56 and the like estimate a disposable income of the user in consideration of the estimated value of the disposable income of another imaging person estimated in the another imaging person disposable income estimation step S406. That is, the disposable income estimation unit 56 and the like estimate the disposable income of the user by giving priority to the analysis target image in which the user himself is the imaging person.

The disposable income estimation unit 56 and the like can estimate the disposable income of another imaging person on the basis of the analysis target image in which another person other than the user is the imaging person, and estimate the disposable income of the user by using the estimated value of the disposable income of another imaging person.

In a case of estimating the disposable income of the user by using the estimated value of the disposable income of another imaging person, the disposable income estimation unit 56 and the like can take into account a correlation between the user and another imaging person. For example, the disposable income of the user can be estimated using an age correlation between the user and another imaging person.

Figure 22:
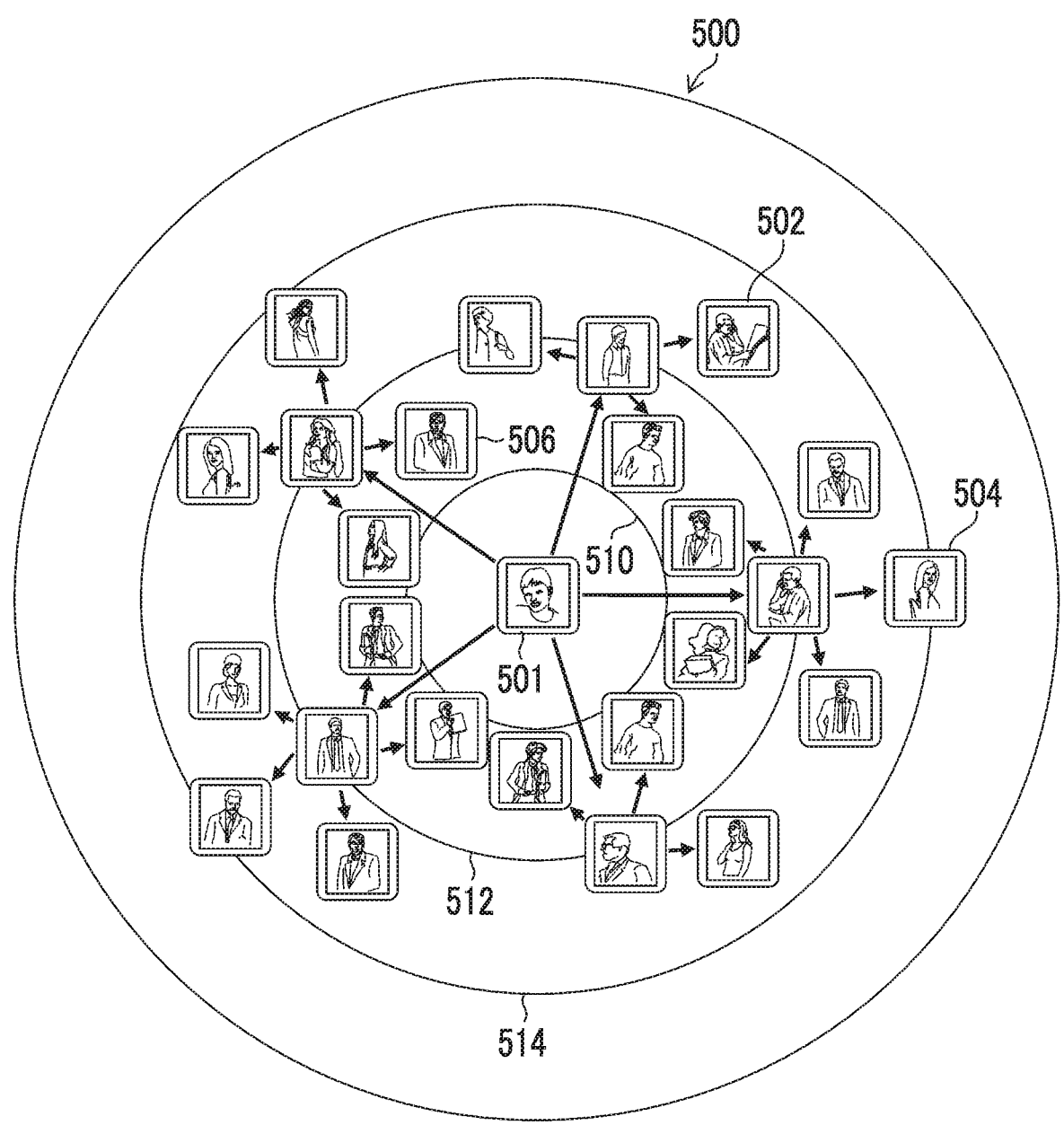
FIG. 22 is a correlation diagram representing a correlation between a user and a related person according to age.

FIG. 22 is a correlation diagram representing a correlation between a user and a related person according to age. A correlation diagram 500 illustrated in FIG. 22 represents a strong correlation between a user 501 and a first related person 502 using the distance to the user 501. The strong correlation takes into account an age of the user 501 and an age of the first related person 502 or the like.

A first boundary line 510 represents a boundary where an age difference with the user 501 is 10 years old. A related person on the first boundary line 510 has an age difference of 10 years from the user 501. A related person inside the first boundary line 510 has an age difference of less than 10 years from the user 501.

A second boundary line 512 represents a boundary line where the age difference from the user 501 is 20 years old. A related person on the second boundary line 512 has an age difference of 20 years from the user 501. A related person outside the first boundary line 510 and inside the second boundary line 512 have an age difference of more than 10 years and less than 20 years from the user 501.

A third boundary line 514 represents a boundary line where the age difference from the user 501 is 30 years old. A related person on the third boundary line 514 has an age difference of 30 years from the user 501. A related person outside the second boundary line 512 and inside the third boundary line 514 have an age difference of more than 20 years and less than 30 years from the user 501.

The first related person 502 illustrated in FIG. 22 has an age difference of more than 20 years and less than 30 years from the user 501. A second related person 504 has an age difference of 30 years from the user 501. The first related person 502 has a shorter distance to the user 501 than the second related person 504 and has a strong correlation.

A third related person 506 has an age difference of more than 10 years and less than 20 years from the user 501. The third related person 506 has a shorter distance to the user 501 and a stronger correlation than the first related person 502 and the second related person 504.

A disposable income of another imaging person having similar age is defined to have a relatively small difference from the disposable income of the user 501, and the disposable income of the user 501 can be estimated using the estimated value of the disposable income of another imaging person. In addition, a disposable income of a related person whose distance to the user 501 illustrated in the correlation diagram 500 in FIG. 22 is relatively close may define that the difference from the disposable income of the user 501 is relatively small.

Figure 23:
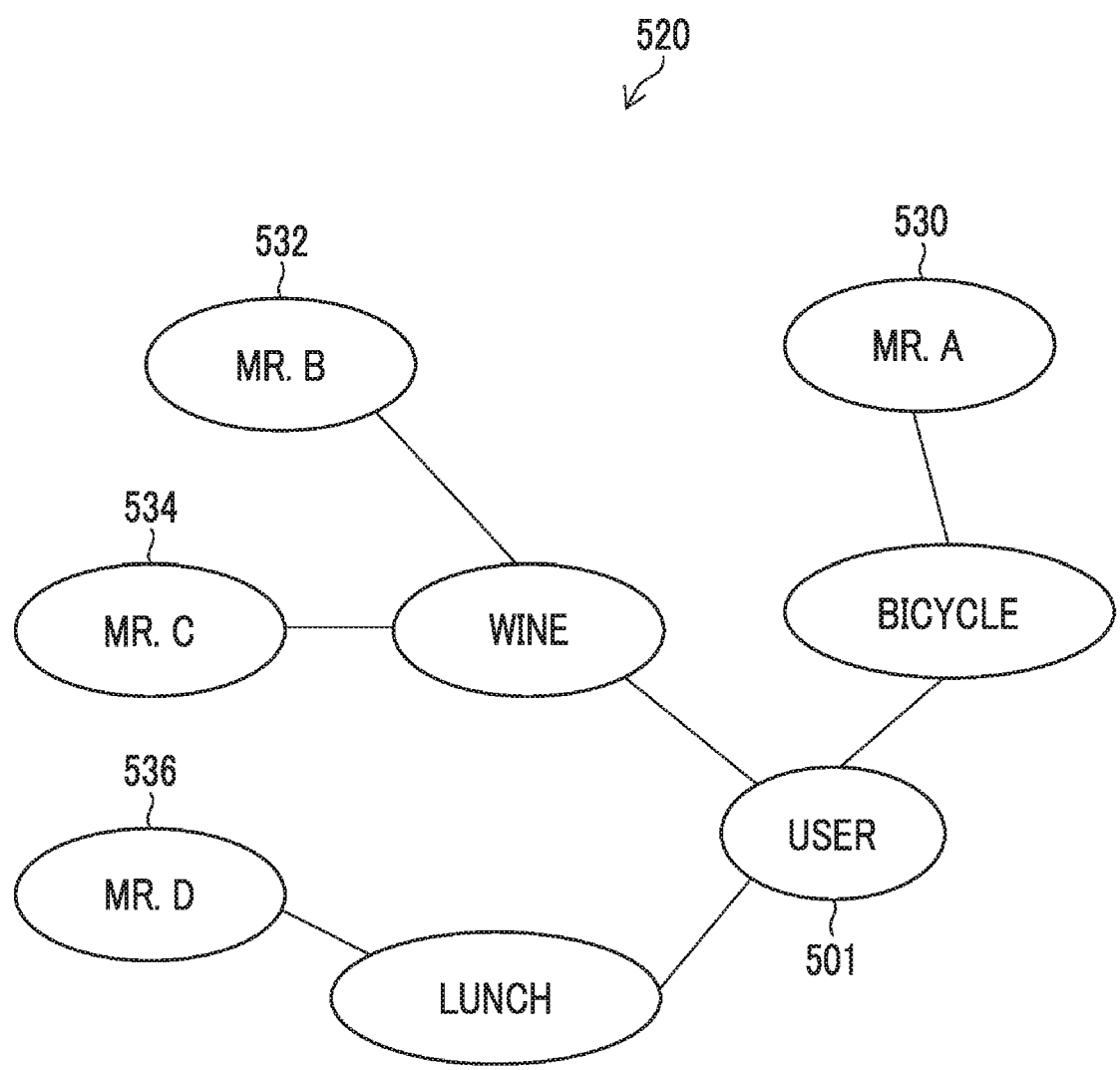
FIG. 23 is a correlation diagram representing a correlation between a user and a related person according to a hobby.

FIG. 23 is a correlation diagram representing a correlation between a user and a related person according to a hobby. In the correlation diagram 520 illustrated in FIG. 23, a fourth related person 530, a fifth related person 532, a sixth related person 534, and a seventh related person 536 are classified on the basis of hobbies. FIG. 23 exemplifies bicycles, wine, and lunch as hobbies.

A disposable income of another imaging person having the same hobby as the user 501 is defined to have a relatively small difference from the disposable income of the user 501, and the disposable income of the user 501 can be estimated using the estimated value of the disposable income of another imaging person.

In the present embodiment, an example in which related persons of the user are classified according to the age and the hobby is illustrated, but the correlation with the user may be defined according to an educational background, one's hometown, an occupation, and the like.

Operation Effect of Modification Example

According to the modification example described above, the photographers are estimated for a plurality of images to be analyzed, and the disposable income is estimated for each imaging person. In a case of estimating the disposable income of the user, an estimated value of a disposable income of another imaging person is used. Thereby, the disposable income of the user can be estimated in consideration of the estimated value of the disposable income of another imaging person. In addition, the disposable income of the user can be estimated in consideration of the correlation between the user and another imaging person.

Application Example to Network System

The server apparatus 12 and the image database 14 illustrated in FIG. 1 may be connected so as to be able to perform communication through a network. In addition, the component such as the server apparatus 12 illustrated in FIG. 2 may be connected so as to be able to perform communication through a network.

That is, a distributed arrangement or a collective arrangement may be applied to each unit configuring the server apparatus 12 and the like illustrated in FIG. 2. Cloud computing may be applied to the image processing system 10 and the like illustrated in FIG. 1.

Application Example to Image Management System

The image processing system 10 and the like illustrated in FIG. 1 may be configured as a part of an image management system. The image management system automatically analyzes a subject, an imaging scene, and the like of an image uploaded from the user terminal apparatus 20 illustrated in FIG. 1 and automatically performs a tagging process.

The user can perform a search for an image stored in the image database 14 using a tag attached to a random image. In addition, the user can perform manual the tagging process on the image uploaded by the user.

Application Example to Program

A program corresponding to the image processing system 10 and the recommendation information providing method disclosed in the present specification can be configured. That is, the present specification discloses a program (image processing program) that causes a computer to realize an object recognition function, a disposable income range conversion function, an accessory information acquisition function, a frequency derivation function, a coefficient derivation function, a disposable income estimation function, and a recommendation information transmission function. Further, a non-transitory, tangible computer-readable recording medium which records the image processing program can be also configured. The image processing system 10 and the recommendation information providing method disclosed in the present specification can be realized when the image processing program is read out from the recoding medium and executed by a computer.

The object recognition function analyzes two or more analysis target images included in an image group including a plurality of images related to a user and recognizes objects included in each of the two or more analysis target images.

The disposable income range conversion function converts information of the object recognized using the object recognition function into disposable income range information representing a range of a disposable income of the user. The accessory information acquisition function acquires accessory information of the analysis target image including imaging date information representing an imaging date of the analysis target image for the two or more analysis target images in which the object is recognized using the object recognition function.

The frequency derivation function derives an appearance frequency of the object on the basis of the imaging date information. The coefficient derivation function derives a weighting coefficient corresponding to the object on the basis of appearance frequency information representing the appearance frequency.

The disposable income estimation function estimates the disposable income of the user using the disposable income range information and the weighting coefficient. The recommendation information transmission function transmits recommendation information related to the object to the user according to the disposable income of the user.

In the embodiment of the present invention described above, constituent components can be appropriately changed, added, or deleted in a range not departing from the spirit of the present invention. The present invention is not limited to the embodiments described above, and various modifications can be made within the technical idea of the present invention by those skilled in the art.

EXPLANATION OF REFERENCES

10: image processing system
12: server apparatus
14: image database
16: disposable income database
16A: price range determination database
16B: disposable income range conversion database
16C: weighting coefficient database
18: recommendation information database
19: manager terminal apparatus
20: user terminal apparatus
22: display unit
30: internet
40: image acquisition unit
42: accessory information acquisition unit
44: object recognition unit
46: type determination unit
48: price range determination unit
50: disposable income range conversion unit
52: frequency derivation unit
54: coefficient derivation unit
56: disposable income estimation unit
58: recommendation information transmission unit
59: user information acquisition unit
60: belonging determination unit
100: price range determination table
110: disposable income range conversion table
120: weighting coefficient table
140: recommendation information display screen
142: user identification information
144: recommendation information
146: operation button
200: image processing system
212: server apparatus
240: recommendation information display screen
242: user identification information
244: recommendation information
246: operation button
300: image processing system
312: server apparatus
344: object recognition unit
346: type determination unit
346A: type determination unit
348: price range determination unit
350: disposable income range conversion unit
370: price range determination table
372: user's home location information acquisition unit
372A: user's home location information acquisition unit
374: separation distance derivation unit
376: event type determination unit
380: disposable income range conversion table
390: weighting coefficient table
500: correlation diagram
501: user
502: first related person
504: second related person
506: third related person
510: first boundary line
512: second boundary line
514: third boundary line
520: correlation diagram
530: fourth related person
532: fifth related person
534: sixth related person
536: seventh related person S10 to S408: each step of recommendation information providing method

What is claimed is:

1. An image processing system comprising a processor and a storage, wherein the processor is configured to:
store, in the storage, two or more analysis target images included in an image group including a plurality of images related to a user;
analyze the two or more analysis target images and recognize an object included in each of the two or more analysis target images;
convert information on the recognized object into disposable income range information representing a range of a disposable income of the user;
acquire accessory information of the analysis target image including imaging date information representing an imaging date of the analysis target image for the two or more analysis target images in which the object is recognized;
derive an appearance frequency of the object on the basis of the imaging date information;
derive a weighting coefficient corresponding to the object on the basis of appearance frequency information representing the appearance frequency;
estimate the disposable income of the user using the disposable income range information and the weighting coefficient; and
transmit recommendation information related to the object to the user according to the estimated disposable income of the user.

2. The image processing system according to claim 1, wherein the processor is configured to recognize an article included in the analysis target image as the object.

3. The image processing system according to claim 2, wherein the processor is further configured to:
determine whether the object is belongings or a rental item on the basis of the appearance frequency of the object; and
transmit information on a purchased item as the recommendation information in a case where the object is the belongings of the user and transmit information on the rental item as the recommendation information in a case where the object is the rental item.

4. The image processing system according to claim 1, wherein the processor is further configured to:
determine a type of the recognized object.

5. The image processing system according to claim 4, further comprising:
a type storage configured to store a relationship between the object and the type of the object,
wherein the processor is configured to determine the type of the object with reference to the type storage.

6. The image processing system according to claim 1, wherein the processor is configured to recognize an imaging scene of the analysis target image as the object.

7. The image processing system according to claim 6, wherein the processor is configured to determine an event corresponding to the imaging scene as a type of the object.

8. The image processing system according to claim 6, wherein the processor is further configured to:
determine a type of the recognized object.

9. The image processing system according to claim 8, further comprising:
a type storage configured to store a relationship between the object and the type of the object,
wherein the processor is configured to determine the type of the object with reference to the type storage.

10. The image processing system according to claim 8, wherein the processor is further configured to:
acquire information on an imaging location of the analysis target image, image; and
determine an event corresponding to the object on the basis of a positional relationship between a reference location of the user corresponding to the image group and the imaging location of the analysis target image.

11. The image processing system according to claim 10, wherein the processor is configured to determine a type of event corresponding to the object on the basis of a distance from the reference location to the imaging location of the analysis target image.

12. The image processing system according to claim 10, wherein the processor is configured to acquire the accessory information including imaging location information representing the imaging location of the analysis target image.

13. The image processing system according to claim 10, wherein the processor is configured to analyze the analysis target image and specify the imaging location of the analysis target image.

14. The image processing system according to claim 10, wherein the processor is configured to acquire the accessory information including information on the reference location.

15. The image processing system according to claim 10, wherein the processor is further configured to:
analyze the analysis target image and specify the reference location.

16. The image processing system according to claim 1, wherein the processor is further configured to:
determine a price range of the object corresponding to a type of the object.

17. The image processing system according to claim 16, further comprising:
a price range storage configured to store a relationship between the type of the object and the price range,
wherein the processor is configured to determine the price range of the object with reference to the price range storage.

18. The image processing system according to claim 17, further comprising:
a disposable income range storage configured to store a relationship between the price range and the disposable income range representing the range of the disposable income of the user,
wherein the processor is configured to convert the price range information representing the price range into the disposable income range information representing the disposable income range of the user with reference to the disposable income range storage.

19. The image processing system according to claim 1, further comprising:
a coefficient storage configured to store a relationship between a type of the object and the weighting coefficient,
wherein the processor is configured to derive the weighting coefficient applied to the object with reference to the coefficient storage.

20. The image processing system according to claim 1, wherein the processor is further configured to:
acquire user information for specifying the user.

21. An image processing method comprising:
- storing, in a storage, two or more analysis target images included in an image group including a plurality of images related to a user;
- analyzing the two or more analysis target images and recognizing objects included in each of the two or more analysis target images;
- converting information on the recognized object into disposable income range information representing a range of a disposable income of the user;
- acquiring accessory information of the analysis target image including imaging date information representing an imaging date of the analysis target image for the two or more analysis target images in which the object is recognized;
- deriving an appearance frequency of the object on the basis of the imaging date information;
- deriving a weighting coefficient corresponding to the object on the basis of appearance frequency information representing the appearance frequency;
- estimating the disposable income of the user using the disposable income range information and the weighting coefficient; and
- transmitting recommendation information related to the object to the user according to the estimated disposable income of the user.

22. A non-transitory, tangible computer-readable recording medium which records an image processing program that causes a computer to:
- store, in a storage, two or more analysis target images included in an image group including a plurality of images related to a user;
- analyze the two or more analysis target images and recognize objects included in each of the two or more analysis target images;
- convert information on the recognized object into disposable income range information representing a range of a disposable income of the user;
- acquire accessory information of the analysis target image including imaging date information representing an imaging date of the analysis target image for the two or more analysis target images in which the object is recognized;
- derive an appearance frequency of the object on the basis of the imaging date information;
- derive a weighting coefficient corresponding to the object on the basis of appearance frequency information representing the appearance frequency;
- estimate the disposable income of the user using the disposable income range information and the weighting coefficient; and
- transmit recommendation information related to the object to the user according to the estimated disposable income of the user.

\* \* \* \* \*